(12) United States Patent
Newman et al.

(10) Patent No.: US 12,231,831 B2
(45) Date of Patent: Feb. 18, 2025

(54) SMART SECURITY CAMERA WITH DETECTION OF SUSPICIOUS CELLPHONES

(71) Applicants: Frederic M Newman, Midland, TX (US); Robert J Harter, La Crosse, WI (US)

(72) Inventors: Frederic M Newman, Midland, TX (US); Robert J Harter, La Crosse, WI (US)

( * ) Notice: Subject to any disclaimer, the term of this patent is extended or adjusted under 35 U.S.C. 154(b) by 0 days.

(21) Appl. No.: 18/748,055

(22) Filed: Jun. 19, 2024

(65) Prior Publication Data

US 2024/0348761 A1 Oct. 17, 2024

(51) Int. Cl.
*H04N 9/79* (2006.01)
*G08B 13/196* (2006.01)
*H04W 12/79* (2021.01)

(52) U.S. Cl.
CPC ......... *H04N 9/79* (2013.01); *G08B 13/19619* (2013.01); *G08B 13/19656* (2013.01); *G08B 13/19671* (2013.01); *H04W 12/79* (2021.01)

(58) Field of Classification Search
CPC .......................... H04N 9/79; G08B 13/19619
See application file for complete search history.

(56) References Cited

U.S. PATENT DOCUMENTS

| | | |
|---|---|---|
| 8,635,373 B1 | 1/2014 | Supramaniam et al. |
| 9,172,605 B2 | 10/2015 | Hardy et al. |
| 9,641,335 B2 | 5/2017 | Bruce et al. |
| 10,185,023 B2 | 1/2019 | Diao et al. |
| 10,365,356 B2 | 7/2019 | Stokes et al. |
| 10,467,480 B2 | 11/2019 | Wan |
| 10,499,220 B2 | 12/2019 | Kuo et al. |
| 11,196,492 B2 | 12/2021 | Munir |
| 11,393,309 B1 | 7/2022 | Wang |
| 11,519,995 B1 | 12/2022 | Yong et al. |

(Continued)

OTHER PUBLICATIONS

SHOPSMART; How and Why Retail Stores are Spying on You; Consumer Reports; https://www.consumerreports.org/cro/2013/03/how-stores-spy-on-you/index.htm#; two pages; dated Mar. 2013.

(Continued)

*Primary Examiner* — Jerry T Jean Baptiste
(74) *Attorney, Agent, or Firm* — bobharter.com; Robert J. Harter

(57) ABSTRACT

A home security camera system captures a picture of a visitor and detects information about the visitor's smartphone, thereby providing a two-part digital ID of the visitor. The two-part ID is particularly useful to law enforcement when the picture portion of the ID happens to be blurry or obstructed. In some examples, a packet scanner sniffs probe requests transmitted by the visitor's phone. The packet scanner can be an integral part of the camera or sold separately. To comply with privacy regulations and bypass obfuscation efforts, the system analyzes various characteristics (e.g., data content and arrangement) of the phone's probe requests, rather than having to discover the true MAC address. The system can notify a resident when a particular friend, mail carrier, or porch pirate returns. The system can share collected digital IDs with other community members to provide neighbors with advanced warnings when certain visitors are in the area.

25 Claims, 25 Drawing Sheets

(56) References Cited

U.S. PATENT DOCUMENTS

| | | |
|---|---|---|
| 11,782,523 B2 | 10/2023 | Li et al. |
| 11,799,750 B1 | 10/2023 | Prasad et al. |
| D1,015,403 S | 2/2024 | Lai et al. |
| 11,935,394 B1 | 3/2024 | Meenehan |
| 11,979,538 B2 | 5/2024 | Ushinohama |
| 2012/0281000 A1 | 11/2012 | Woodings |
| 2013/0169801 A1 | 7/2013 | Martin et al. |
| 2014/0006660 A1 | 1/2014 | Frei et al. |
| 2015/0146267 A1 | 5/2015 | Miller et al. |
| 2018/0047227 A1* | 2/2018 | Beavers ............. G07C 9/00571 |
| 2018/0101735 A1 | 4/2018 | Lemberger et al. |
| 2018/0301008 A1 | 10/2018 | Diao et al. |
| 2018/0308328 A1 | 10/2018 | Siminoff |
| 2019/0215423 A1 | 7/2019 | Ortiz et al. |
| 2020/0065472 A1 | 2/2020 | Son |
| 2020/0351156 A1 | 11/2020 | Zhang et al. |
| 2021/0271936 A1 | 9/2021 | Xia et al. |
| 2022/0060452 A1 | 2/2022 | Kosbab et al. |
| 2022/0070975 A1* | 3/2022 | Chen .................... H04W 12/79 |
| 2023/0148353 A1* | 5/2023 | Amini .................. H04N 19/124 |
| | | 370/329 |
| 2023/0155917 A1 | 5/2023 | Lee et al. |
| 2023/0171594 A1 | 6/2023 | Dong |
| 2023/0336576 A1 | 10/2023 | Suzuki et al. |
| 2023/0336995 A1 | 10/2023 | Hu et al. |
| 2024/0195822 A1 | 6/2024 | Iguchi |

OTHER PUBLICATIONS

Chowdri; Emerging Tech and Law Enforcement: What are Geofences and How do the Work? Lexipol; https://www.lexipol.com/resources/blog/emerging-tech-and-law-enforcement-what-are-geofences-and-how-do-they-work/; Frisco, TX; 13 pages; dated Jan. 4, 2024.

Meshlium; Smartphone Detection; Meshlium Technical Guide; https://development.libelium.com/meshlium-technical-guide/smartphone; 30 pages; dated 2020.

Conradie; ESP8266 Turned Secretive WiFi Probe Request Sniffer; Hackaday; https://hackaday.com/2020/09/20/esp8266-turned-secretive-wifi-probe-request-sniffer/; 12 pages; dated Sep. 20, 2020.

* cited by examiner

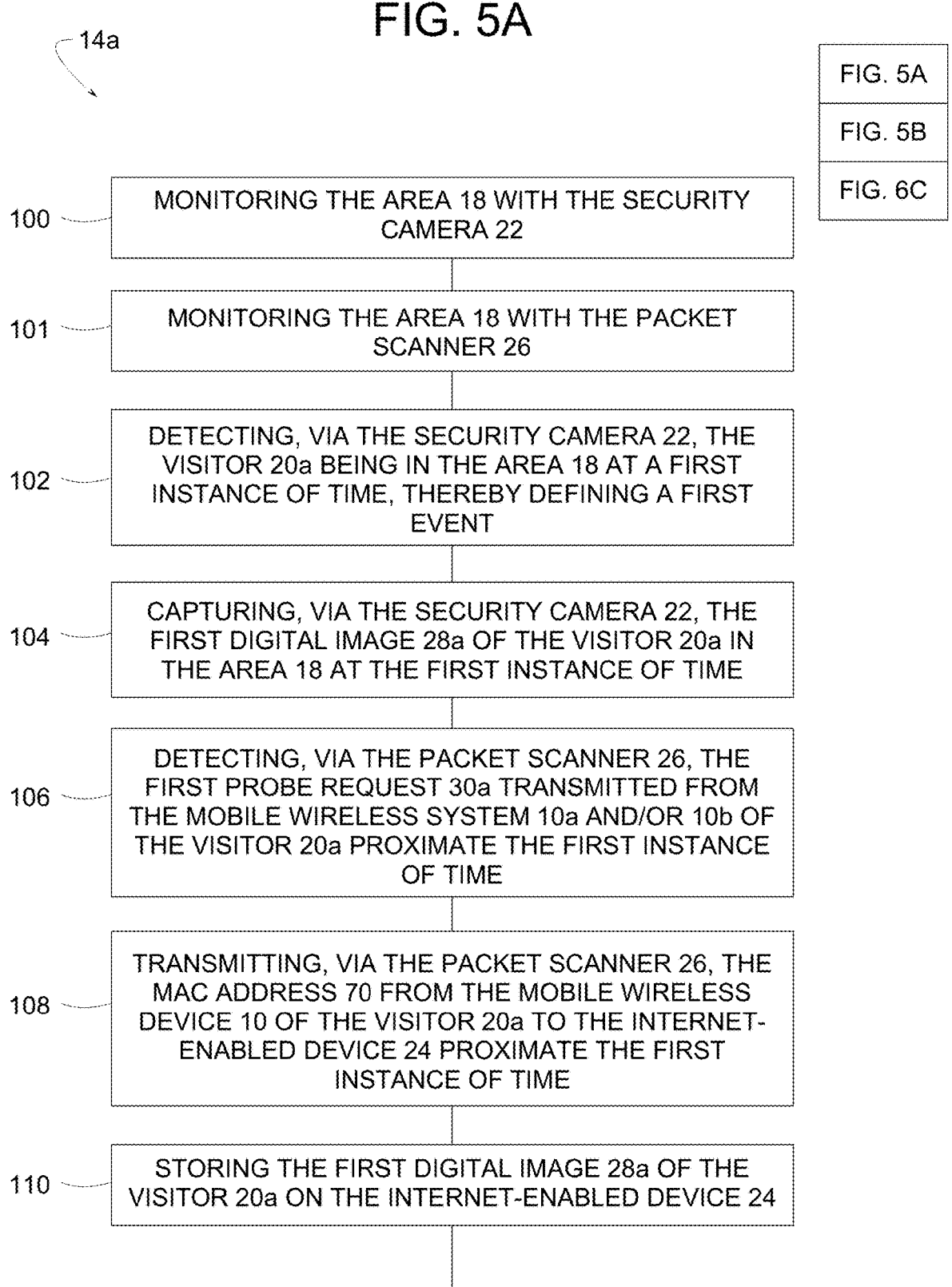

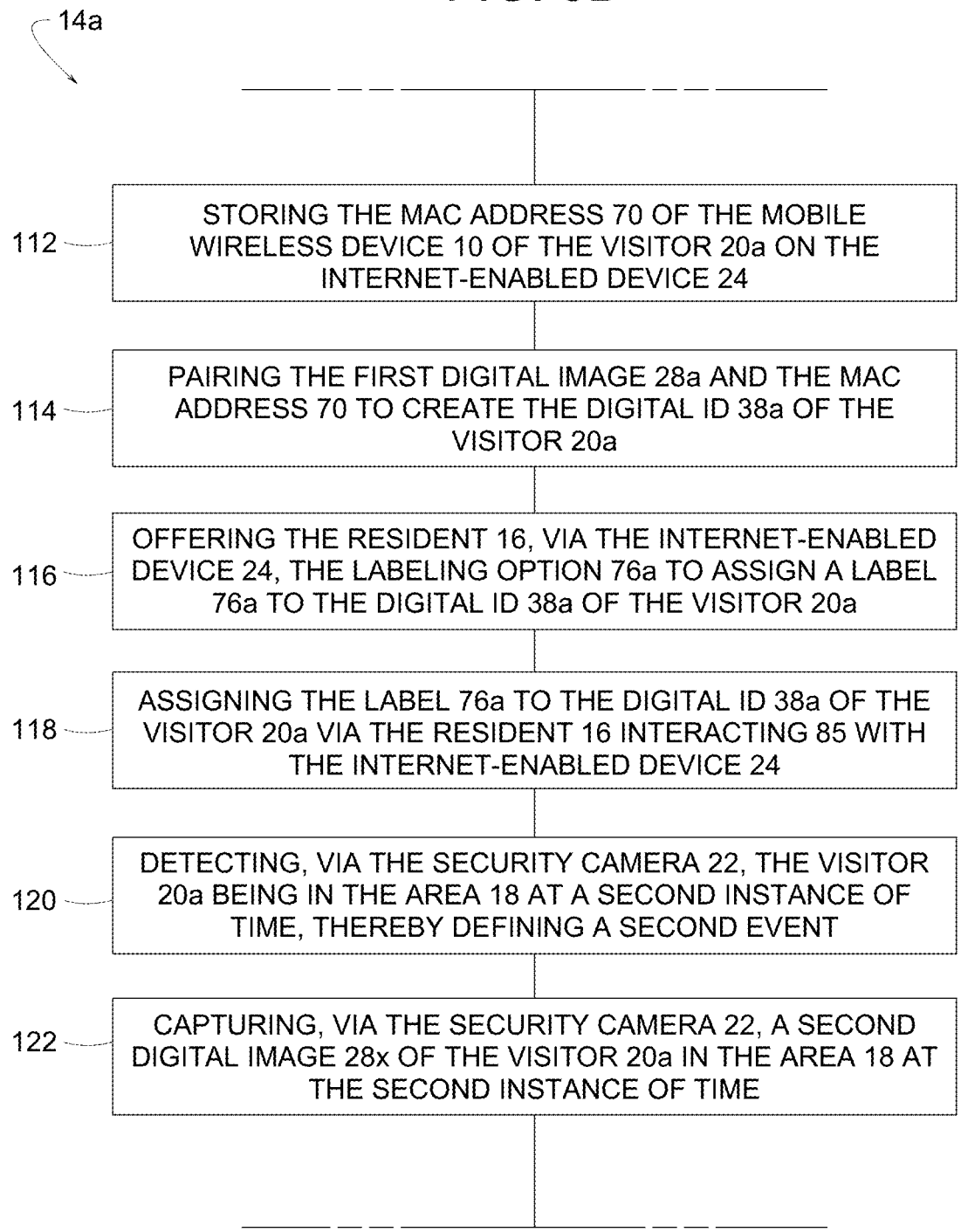

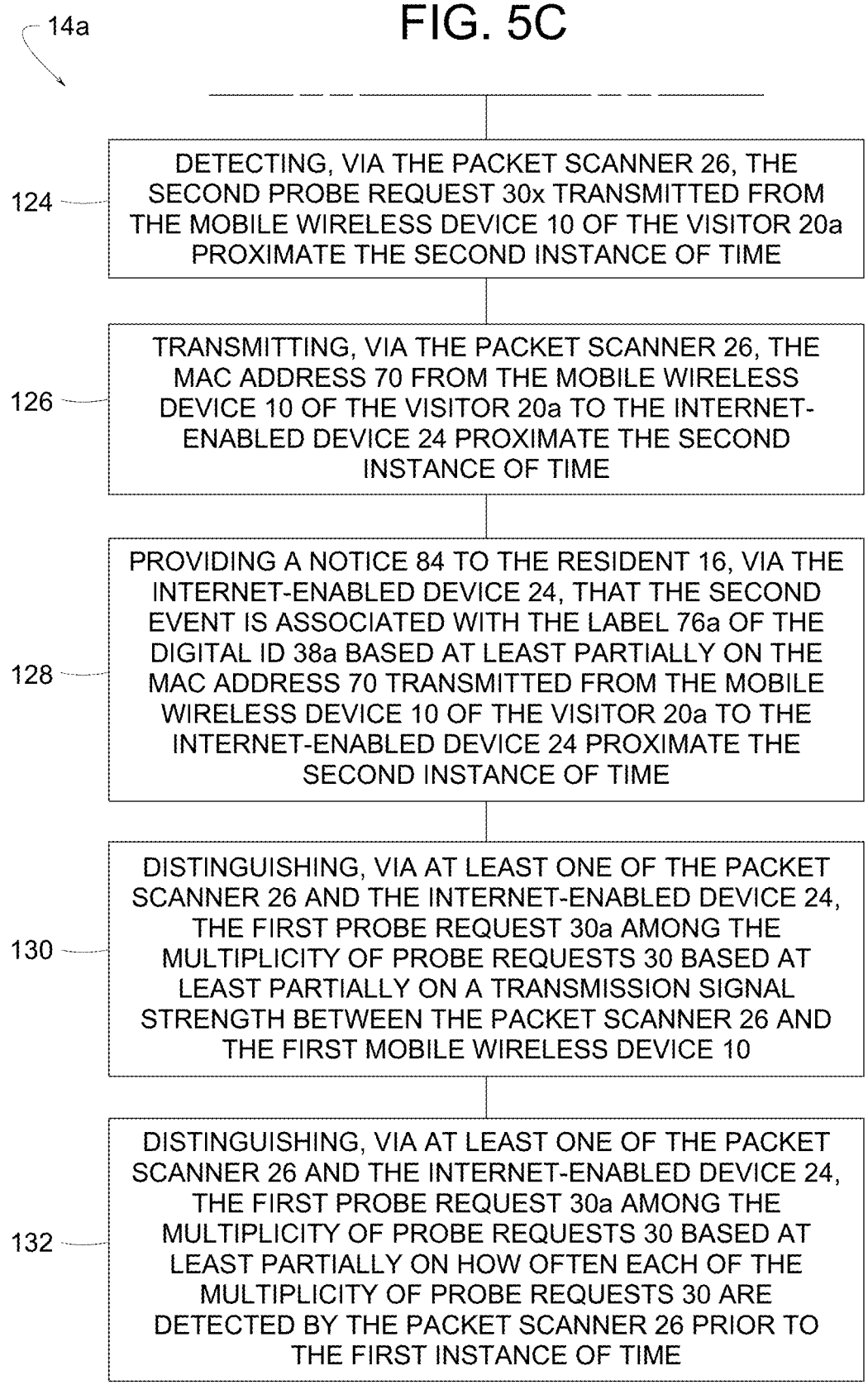

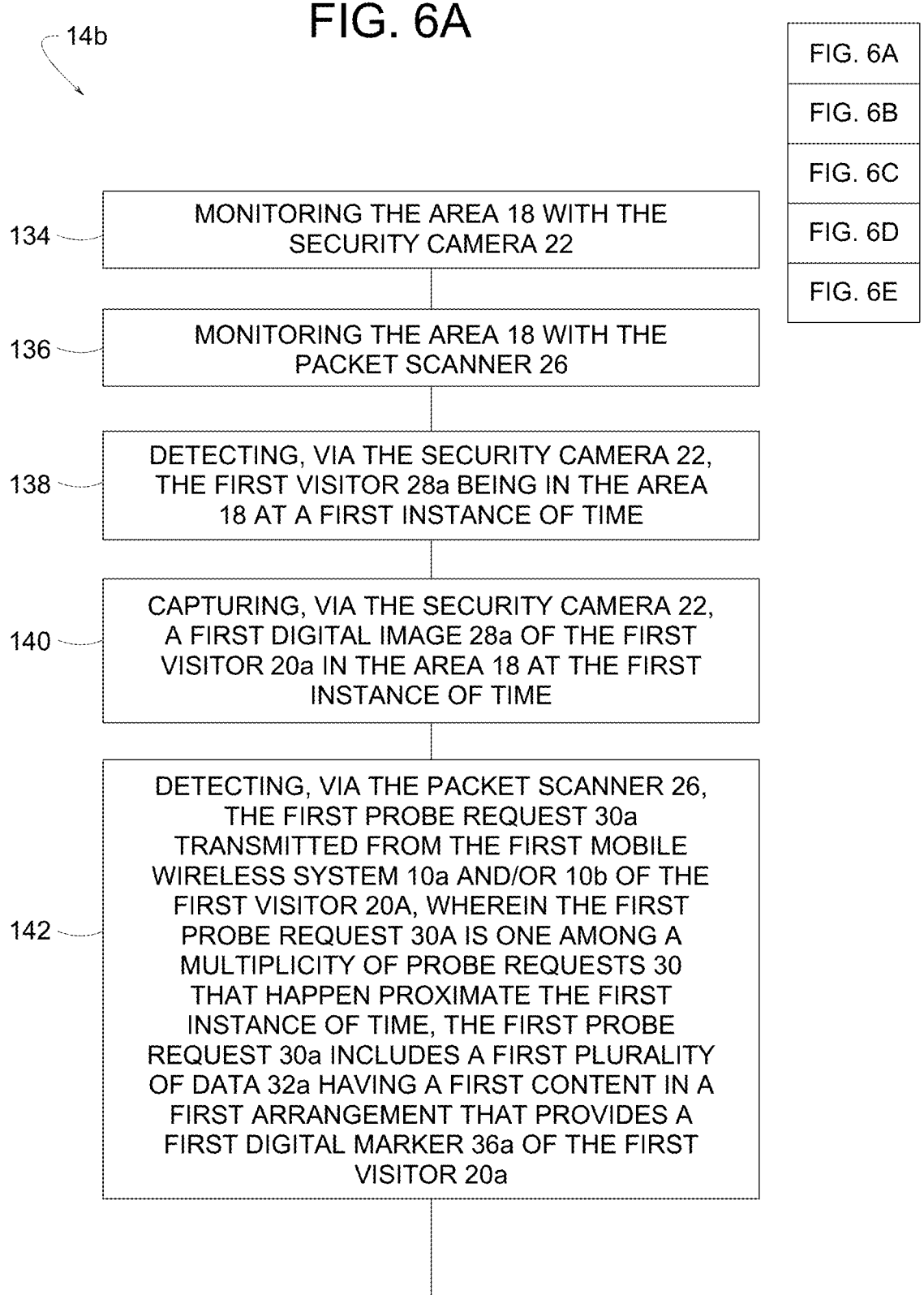

144 — DISTINGUISHING, VIA AT LEAST ONE OF THE INTERNET-ENABLED DEVICE 24 AND THE PACKET SCANNER 26, THE FIRST PROBE REQUEST 30a FROM AMONG THE MULTIPLICITY OF PROBE REQUESTS 30 BASED AT LEAST PARTIALLY ON ONE OF THE FOLLOWING:
a) A TRANSMISSION SIGNAL STRENGTH BETWEEN THE PACKET SCANNER 26 AND THE FIRST MOBILE WIRELESS SYSTEM 10a AND/OR 10b, AND
b) HOW OFTEN EACH OF THE MULTIPLICITY OF PROBE REQUESTS 30 ARE DETECTED BY THE PACKET SCANNER 26 PRIOR TO THE FIRST INSTANCE OF TIME

146 — STORING THE FIRST DIGITAL IMAGE 28a OF THE FIRST VISITOR 20a ON AT LEAST ONE OF THE SECURITY CAMERA 22 AND THE INTERNET-ENABLED DEVICE 24

148 — STORING THE FIRST DIGITAL MARKER 36a OF THE FIRST VISITOR 20a ON AT LEAST ONE OF THE SECURITY CAMERA 22 AND THE INTERNET-ENABLED DEVICE 24

150 — PAIRING THE FIRST DIGITAL IMAGE 28a OF THE FIRST VISITOR 20a AND THE FIRST DIGITAL MARKER 36a OF THE FIRST VISITOR 20a TO CREATE A FIRST DIGITAL ID 38a OF THE FIRST VISITOR 20a

152 — DETECTING, VIA THE SECURITY CAMERA 22, THE SECOND VISITOR 20b BEING IN THE AREA 18 AT A SECOND INSTANCE OF TIME

154 — CAPTURING, VIA THE SECURITY CAMERA 22, A SECOND DIGITAL IMAGE 28b OF THE SECOND VISITOR 20b IN THE AREA 18 AT THE SECOND INSTANCE OF TIME

156 — DETECTING, VIA THE PACKET SCANNER 26, THE SECOND PROBE REQUEST 30b TRANSMITTED FROM THE SECOND MOBILE WIRELESS SYSTEM 10a AND/OR 10b OF THE SECOND VISITOR 20b, WHEREIN THE SECOND PROBE REQUEST 30b HAPPENS PROXIMATE THE SECOND INSTANCE OF TIME, AND THE SECOND PROBE REQUEST 30b INCLUDES A SECOND PLURALITY OF DATA 32b HAVING A SECOND CONTENT IN A SECOND ARRANGEMENT THAT PROVIDES A SECOND DIGITAL MARKER 36b OF THE SECOND VISITOR 20b;

158 — STORING THE SECOND DIGITAL IMAGE 28b OF THE SECOND VISITOR 20b ON AT LEAST ONE OF THE SECURITY CAMERA 22 AND THE INTERNET-ENABLED DEVICE 24

160 — STORING THE SECOND DIGITAL MARKER 36b OF THE SECOND VISITOR 20b ON THE INTERNET-ENABLED DEVICE 24

162 — PAIRING THE SECOND DIGITAL IMAGE 28b OF THE SECOND VISITOR 20b AND THE SECOND DIGITAL MARKER 36b OF THE SECOND VISITOR 20b TO CREATE A SECOND DIGITAL ID 38b OF THE SECOND VISITOR 20b

164 — DETECTING, VIA THE SECURITY CAMERA 22, THE MYSTERY VISITOR 20x BEING IN THE AREA 18 AT A THIRD INSTANCE OF TIME

166 — CAPTURING, VIA THE SECURITY CAMERA 22, A THIRD DIGITAL IMAGE 28x OF THE MYSTERY VISITOR 20x IN THE AREA 18 AT THE THIRD INSTANCE OF TIME

FIG. 6D

168 — DETECTING, VIA THE PACKET SCANNER 26, THE MYSTERY PROBE REQUEST 30x TRANSMITTED FROM THE MYSTERY MOBILE WIRELESS SYSTEM 10a AND/OR 10b OF THE MYSTERY VISITOR 20x, WHEREIN THE MYSTERY PROBE REQUEST 30x EXCLUDES THE TRUE MAC ADDRESS OF THE MYSTERY MOBILE WIRELESS SYSTEM 10a AND/OR 10b, THEREBY PRESERVING SOME PRIVACY OF THE MYSTERY VISITOR 20x; THE MYSTERY PROBE REQUEST 30x HAPPENS PROXIMATE THE THIRD INSTANCE OF TIME, AND THE MYSTERY PROBE REQUEST 30x INCLUDES A THIRD PLURALITY OF DATA 32x HAVING A THIRD CONTENT IN A THIRD ARRANGEMENT THAT PROVIDES A THIRD DIGITAL MARKER 36x OF THE MYSTERY VISITOR 20x

170 — STORING THE THIRD DIGITAL IMAGE 28x OF THE MYSTERY VISITOR 20x ON AT LEAST ONE OF THE SECURITY CAMERA 22 AND THE INTERNET-ENABLED DEVICE 24

172 — STORING THE THIRD DIGITAL MARKER 36x OF THE MYSTERY VISITOR 20x ON THE INTERNET-ENABLED DEVICE 24

174 — PAIRING THE THIRD DIGITAL IMAGE 28x OF THE MYSTERY VISITOR 20x AND THE THIRD DIGITAL MARKER 30x OF THE MYSTERY VISITOR 20x TO CREATE A THIRD DIGITAL ID 38x OF THE MYSTERY VISITOR 20x

176 — DETERMINING, VIA THE INTERNET-ENABLE DEVICE 24, A FIRST DEGREE OF SIMILARITY BETWEEN THE THIRD DIGITAL MARKER 36x AND THE FIRST DIGITAL MARKER 36a

178 — INFERRING, VIA THE INTERNET-ENABLE DEVICE 24, WHETHER OR NOT THE FIRST DEGREE OF SIMILARITY SUGGESTS THAT THE MYSTERY VISITOR 20x IS THE FIRST VISITOR 20a

180 — OFFERING THE RESIDENT 16, VIA THE INTERNET-ENABLE DEVICE 24, AT LEAST ONE OF THE FOLLOWING THREE OPTIONS:
a) A FIRST LABELING OPTION 76a TO ASSIGN A FIRST LABEL 76a TO THE FIRST VISITOR 20a;
b) A FIRST RATING OPTION 78a TO ASSIGN A FIRST SECURITY RATING 78a TO THE FIRST VISITOR 20a, WHEREIN THE FIRST SECURITY RATING 78a INDICATES HOW WELL THE RESIDENT 16 TRUSTS THE FIRST VISITOR 20a; AND
c) A FIRST SHARING OPTION 80a THAT INDICATES WHETHER OR NOT THE INTERNET-ENABLED DEVICE 24 IS TO SHARE THE FIRST DIGITAL ID 38a OF THE FIRST VISITOR 20a WITH THE COMMUNITY MEMBER 48

182 — ADDING THE THIRD DIGITAL ID 38x TO THE FIRST DIGITAL ID 38a WHEN THE INTERNET-ENABLE DEVICE 24 INFERS THAT THE FIRST DEGREE OF SIMILARITY SUGGESTS THAT THE MYSTERY VISITOR 20x IS THE FIRST VISITOR 20a

184 — PROVIDING THE RESIDENT 16, VIA THE INTERNET-ENABLED DEVICE 24, AN ALERT 84 INDICATING THAT THE MYSTERY VISITOR 20x IS THE FIRST VISITOR 20a WHEN THE INTERNET-ENABLED DEVICE 24 INFERS THAT THE FIRST DEGREE OF SIMILARITY SUGGESTS THAT THE MYSTERY VISITOR 20x IS THE FIRST VISITOR 20a, WHEREIN THE ALERT 84 INDICATES AT LEAST ONE OF THE FIRST LABEL 76a AND THE FIRST SECURITY RATING 78a APPLIES TO THE MYSTERY VISITOR 20x

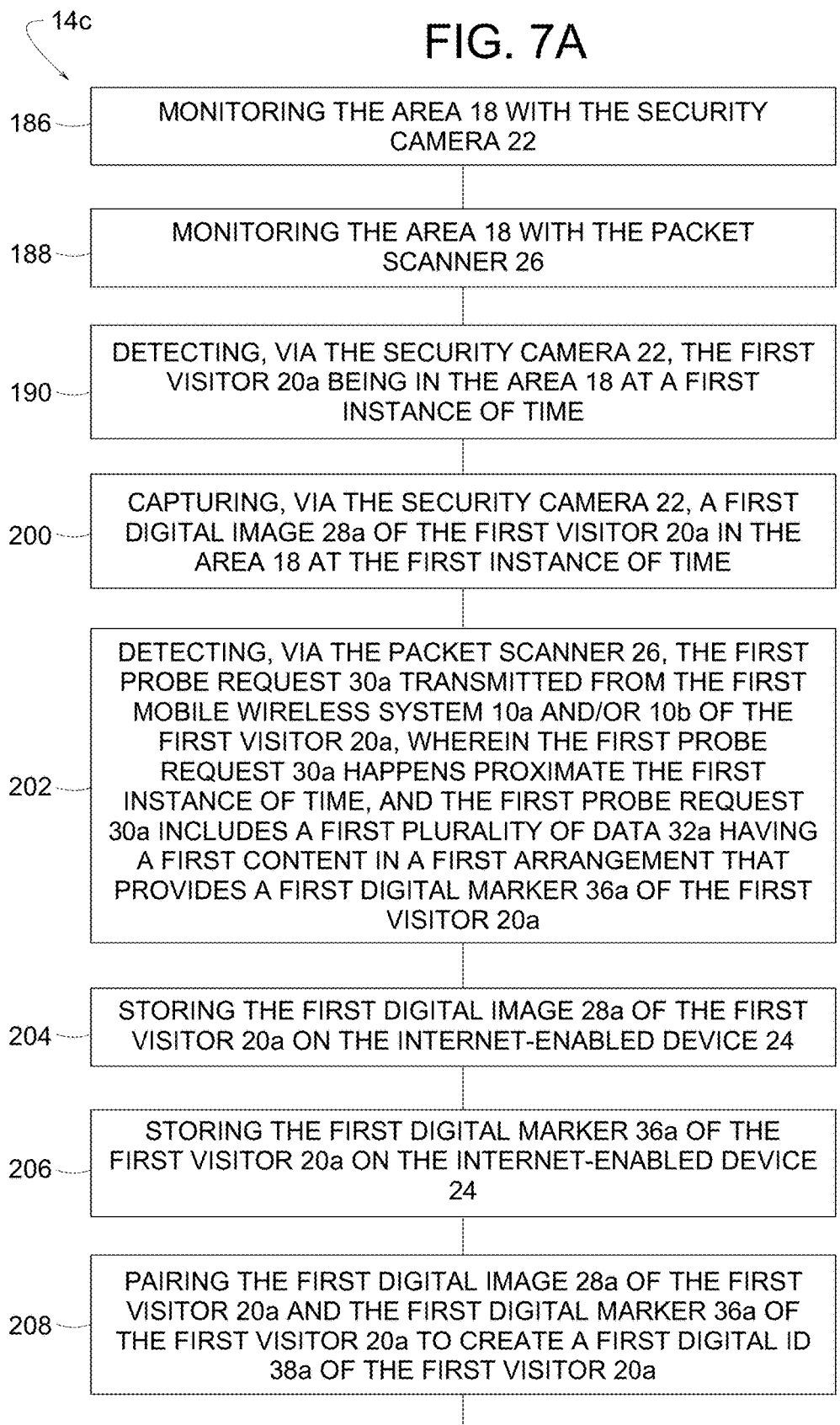

FIG. 7C

222 — PAIRING THE SECOND DIGITAL IMAGE 28b OF THE SECOND VISITOR 20b AND THE SECOND DIGITAL MARKER 36b OF THE SECOND VISITOR 20b TO CREATE A SECOND DIGITAL id 38b OF THE SECEOND VISITOR 20b

224 — PAIRING THE SECOND DIGITAL IMAGE 28b OF THE SECOND VISITOR 20b AND THE SECOND DIGITAL MARKER 36b OF THE SECOND VISITOR 20b TO CREATE A SECOND DIGITAL ID 38b OF THE SECOND VISITOR 20b
OFFERING THE RESIDENT 16, VIA THE INTERNET-ENABLED DEVICE 24, AT LEAST ONE OF THE FOLLOWING THREE OPTIONS:
a) A SECOND LABELING OPTION 76b TO ASSIGN A SECOND LABEL 76b TO THE SECOND VISITOR 20b;
b) A SECOND RATING OPTION 78b TO ASSIGN A SECOND SECURITY RATING 78b TO THE SECOND VISITOR 20b, WHEREIN THE SECOND SECURITY RATING 78b INDICATES HOW WELL THE RESIDENT 26 TRUSTS THE SECOND VISITOR 20b; AND
c) A SECOND SHARING OPTION 80b THAT INDICATES WHETHER OR NOT THE INTERNET-ENABLED DEVICE 24 IS TO SHARE THE SECOND DIGITAL ID 38b OF THE SECOND VISITOR 20b WITH THE COMMUNITY MEMBER 48

226 — DETECTING, VIA THE SECURITY CAMERA 22, THE MYSTERY VISITOR 20x BEING IN THE AREA 18 AT A THIRD INSTANCE OF TIME

228 — CAPTURING, VIA THE SECURITY CAMERA 22, A THIRD DIGITAL IMAGE 28x OF THE MYSTERY VISITOR 20x IN THE AREA 18 AT THE THIRD INSTANCE OF TIME

230 — DETECTING, VIA THE PACKET SCANNER 26, THE MYSTERY PROBE REQUEST 30x TRANSMITTED FROM THE MYSTERY MOBILE WIRELESS SYSTEM 10a AND/OR 10b OF THE MYSTERY VISITOR 20x, WHEREIN THE MYSTERY PROBE REQUEST 30x HAPPENS PROXIMATE THE THIRD INSTANCE OF TIME, AND THE MYSTERY PROBE REQUEST 30x INCLUDES A THIRD PLURALITY OF DATA 32x HAVING A THIRD CONTENT IN A THIRD ARRANGEMENT THAT PROVIDES A THIRD DIGITAL MARKER 36x OF THE MYSTERY VISITOR 20x

FIG. 7E

248 — ADDING THE THIRD DIGITAL ID 38x TO THE FIRST DIGITAL ID 38a WHEN THE INTERNET-ENABLED DEVICE 24 INFERS THAT THE FIRST DEGREE OF SIMILARITY SUGGESTS THAT THE MYSTERY VISITOR 20x IS THE FIRST VISITOR 20a

250 — ADDING THE THIRD DIGITAL ID 38x TO THE SECOND DIGITAL ID 38b WHEN THE INTERNET-ENABLED DEVICE 24 INFERS THAT THE SECOND DEGREE OF SIMILARITY SUGGESTS THAT THE MYSTERY VISITOR 20x IS THE SECOND VISITOR 20b

252 — PROVIDING THE RESIDENT 16, VIA THE INTERNET-ENABLED DEVICE 24, AN ALERT 84 INDICATING THAT THE MYSTERY VISITOR 20x IS THE FIRST VISITOR 20a WHEN THE INTERNET-ENABLED DEVICE 24 INFERS THAT THE FIRST DEGREE OF SIMILARITY SUGGESTS THAT THE MYSTERY VISITOR 20x IS THE FIRST VISITOR 20a, WHEREIN THE ALERT 84 INDICATES AT LEAST ONE OF THE FIRST LABEL 76a AND THE FIRST SECURITY RATING 78a

254 — PROVIDING THE RESIDENT 16, VIA THE INTERNET-ENABLED DEVICE 24, A NOTIFICATION 86 INDICATING THAT THE MYSTERY VISITOR 20x IS THE SECOND VISITOR 20b WHEN THE INTERNET-ENABLED DEVICE 24 INFERS THAT THE SECOND DEGREE OF SIMILARITY SUGGESTS THAT THE MYSTERY VISITOR 20x IS THE SECOND VISITOR 20b, WHEREIN THE NOTIFICATION 86 INDICATES AT LEAST ONE OF THE SECOND LABEL 76b AND THE SECOND SECURITY RATING 78b

256 — PROVIDING THE RESIDENT 16, VIA THE INTERNET-ENABLED DEVICE 24, A NEW NOTIFICATION 88 INDICATING THAT THE MYSTERY VISITOR 20x IS SOMEONE OTHER THAN ONE OF THE FIRST VISITOR 20a AND THE SECOND VISITOR 20b WHEN THE FIRST DEGREE OF SIMILARITY AND THE SECOND DEGREE OF SIMILARITY SUGGEST THAT THE MYSTERY VISITOR 20x IS SOMEONE OTHER THAN ONE OF THE FIRST VISITOR 20a AND THE SECOND VISITOR 20b

258 — OFFERING THE RESIDENT 16, VIA THE INTERNET-ENABLED DEVICE 24, AT LEAST ONE OF THE FOLLOWING THREE OPTIONS:
a) A THIRD LABELING OPTION 76x TO ASSIGN A THIRD LABEL 76x TO THE MYSTERY VISITOR 20x;
b) A THIRD RATING OPTION 78x TO ASSIGN A THIRD SECURITY RATING 78x TO THE MYSTERY VISITOR 20x, WHEREIN THE THIRD SECURITY RATING 78x INDICATES HOW WELL THE RESIDENT 16 TRUSTS THE MYSTERY VISITOR 20x; AND
c) A THIRD SHARING OPTION 80x THAT INDICATES WHETHER OR NOT THE INTERNET-ENABLED DEVICE 24 IS TO SHARE THE THIRD DIGITAL ID 38x OF THE MYSTERY VISITOR 20x WITH THE COMMUNITY MEMBER 48

260 — EXCLUDING THE TRUE MAC ADDRESS FROM THE MYSTERY PROBE REQUEST 30x, THEREBY PRESERVING SOME PRIVACY OF THE MYSTERY VISITOR 20x

262 — DISTINGUISHING, VIA AT LEAST ONE OF THE INTERNET-ENABLED DEVICE 24 AND THE PACKET SCANNER 26, THE FIRST PROBE REQUEST 30a AMONG THE MULTIPLICITY OF PROBE REQUESTS 30 BASED AT LEAST PARTIALLY ON A TRANSMISSION SIGNAL STRENGTH BETWEEN THE INTERNET-ENABLED DEVICE 24 AND THE FIRST MOBILE WIRELESS SYSTEM 10a AND/OR 10b

264 — DISTINGUISHING, VIA AT LEAST ONE OF THE INTERNET-ENABLED DEVICE 24 AND THE PACKET SCANNER 26, THE FIRST PROBE REQUEST 30a AMONG THE MULTIPLICITY OF PROBE REQUESTS 30 BASED AT LEAST PARTIALLY ON HOW OFTEN EACH OF THE MULTIPLICITY OF PROBE REQUESTS 30 ARE DETECTED BY THE PACKET SCANNER 26 PRIOR TO THE FIRST INSTANCE OF TIME

266 — TRANSMITTING A PLURALITY OF IP PACKETS IN A HANDSHAKE BETWEEN THE MYSTERY MOBILE WIRELESS SYSTEM 10a AND/OR 10b AND A LESS RESTRICTED WI-FI NETWORK

268 — ACQUIRING, VIA THE INTERNET-ENABLED DEVICE 24, A TRUE MAC ADDRESS OF THE MYSTERY MOBILE WIRELESS SYSTEM 10a AND/OR 10b UPON TRANSMITTING THE PLURALITY OF IP PACKETS IN A HANDSHAKE BETWEEN THE MYSTERY MOBILE WIRELESS SYSTEM 10a AND/OR 10b AND THE LESS RESTRICTED WI-FI NETWORK

SMART SECURITY CAMERA WITH DETECTION OF SUSPICIOUS CELLPHONES

FIELD OF THE DISCLOSURE

This patent generally pertains to security camera systems and more specifically to systems with means for detecting suspicious smartphones.

BACKGROUND

Smartphones and other mobile wireless devices usually have a unique MAC address (media access control address) permanently assigned to each device. The MAC address can be used for identifying the smartphone when connecting to a Wi-Fi network. Once connected, the Wi-Fi network can link the smartphone to the Internet.

When a smartphone is looking to connect to a hotspot or available Wi-Fi network, the smartphone will broadcast probe requests, basically requesting access to the Internet. A probe request provides information useful in establishing communication with an available network.

Sometimes, a smartphone's true MAC address will be part of the probe request; however, that is becoming increasingly uncommon due to privacy issues. There have been examples where probe requests were intercepted to collect true MAC addresses and use them to track the location of smartphones and their users.

One example has been publically brought to light by Edward Snowden. Snowden, a former NSA contractor, revealed the pervasive surveillance programs conducted by government agencies, including the NSA's mass collection of internet communications. One aspect of this revelation was the exploitation of MAC addresses. Snowden's disclosures showed the extent to which MAC addresses were used to monitor and trace the movements and activities of people both domestically and internationally.

The public uprising at the US Capitol on Jan. 6, 2021 is another example of when MAC addresses played a key role in identifying and tracking smartphones. In this example, law enforcement agencies issued geofence warrants to tech companies like Google, requesting data from smartphones near the Capital during the time of the event. This information enabled authorities to track the movements of certain individuals at the protest.

Google also uses MAC addresses and Google Maps to identify traffic jams. By leveraging location services enabled on smartphones and other devices, Google collects data on the movement and speed of these devices along roadways. By analyzing the patterns of movement and relative speeds of devices within a particular area, Google can pinpoint areas experiencing slow traffic flow in real-time.

One method available to large retailers, such as Walmart, Home Depot, etc., is for retailers to provide shoppers with access to a company app and Wi-Fi access points. This enables retailers to detect and collect MAC addresses from smartphones and other connected devices as shoppers move throughout the store. This allows retailers to analyze foot traffic patterns, understand popular shopping areas, and optimize store layouts. Retailers can also use this method for targeted advertising and personalized promotions, tailoring offers based on shoppers' past behaviors and preferences.

Another option for Starbucks and other coffee shops or cafes is for them to offer their customers a Wi-Fi access point upon receiving an alias MAC address of their customers' smartphone, laptop, tablet or other mobile digital device. Customers might have several randomly generated alias MAC addresses temporarily stored on their device. Each alias can be assigned to a different coffee shop, so repeat visits to a first coffee shop will repeatedly use the same first alias. Likewise, return visits to a second coffee shop will repeatedly use a second alias. This allows each coffee shop to recognize their returning customers, while preserving customer privacy.

BRIEF DESCRIPTION OF THE DRAWINGS

FIG. 5A is a flow diagram illustrating various steps of an example security camera method associated with the security camera system disclosed herein.

FIG. 5B is a flow diagram continuing from the bottom of FIG. 5A and illustrating various steps of the security camera method.

FIG. 5C is a flow diagram continuing from the bottom of FIG. 5B and illustrating various steps of the security camera method.

FIG. 6A is a flow diagram illustrating various steps of an example security camera method associated with the security camera system disclosed herein.

FIG. 6B is a flow diagram continuing from the bottom of FIG. 6A and illustrating various steps of the security camera method.

FIG. 6C is a flow diagram continuing from the bottom of FIG. 6B and illustrating various steps of the security camera method.

FIG. 6D is a flow diagram continuing from the bottom of FIG. 6C and illustrating various steps of the security camera method.

FIG. 6E is a flow diagram continuing from the bottom of FIG. 6D and illustrating various steps of the security camera method.

FIG. 7A is a flow diagram illustrating various steps of an example security camera method associated with the security camera system disclosed herein.

FIG. 7C is a flow diagram continuing from the bottom of FIG. 7B and illustrating various steps of the security camera method.

FIG. 7E is a flow diagram continuing from the bottom of FIG. 6D and illustrating various steps of the security camera method.

FIG. 7F is a flow diagram continuing from the bottom of FIG. 7E and illustrating various steps of the security camera method.

FIG. 7G is a flow diagram continuing from the bottom of FIG. 6F and illustrating various steps of the security camera method.

DETAILED DESCRIPTION

While some tracking systems rely heavily on knowing the true MAC address of traveling smartphones and other mobile wireless devices 10, security camera systems 12 do not. They just need to identify who came to the house. This lower standard of monitoring can be achieved by inferring information about a visitor's mobile wireless device 10 without necessarily knowing its true MAC address.

Thus, the security camera systems 12 presented here sidestep the many efforts currently used for concealing a person's identity, such as using randomized or alias MAC addresses. Moreover, the security camera systems 12 overcome the limitations of other approaches, such as facial recognition, which can be unreliable when captured images are blurred, obstructed or taken in low light conditions or far-away.

Figure 1:
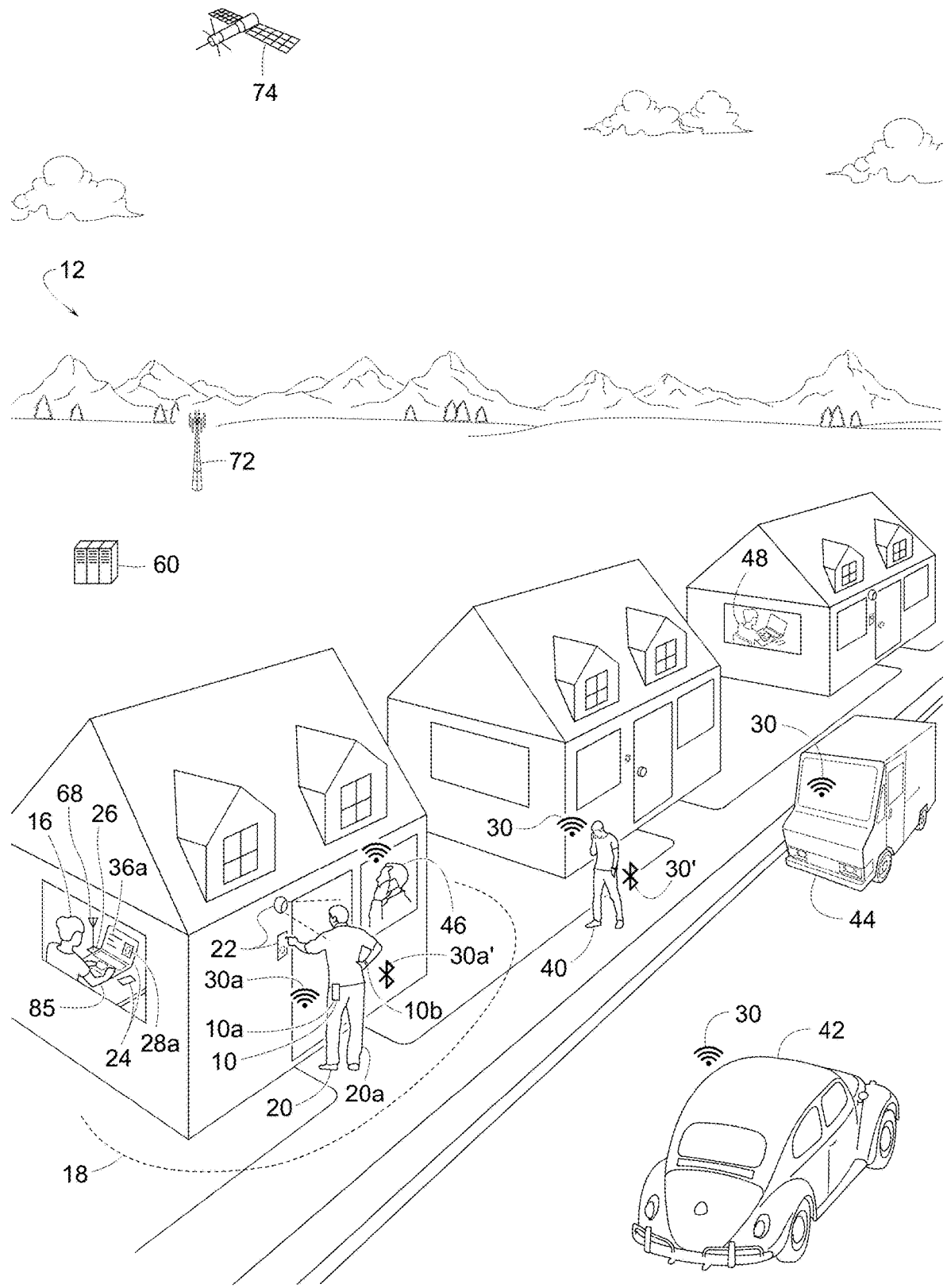
FIG. 1 is a perspective view of an example security camera system at a first instance of time.
Figure 2:
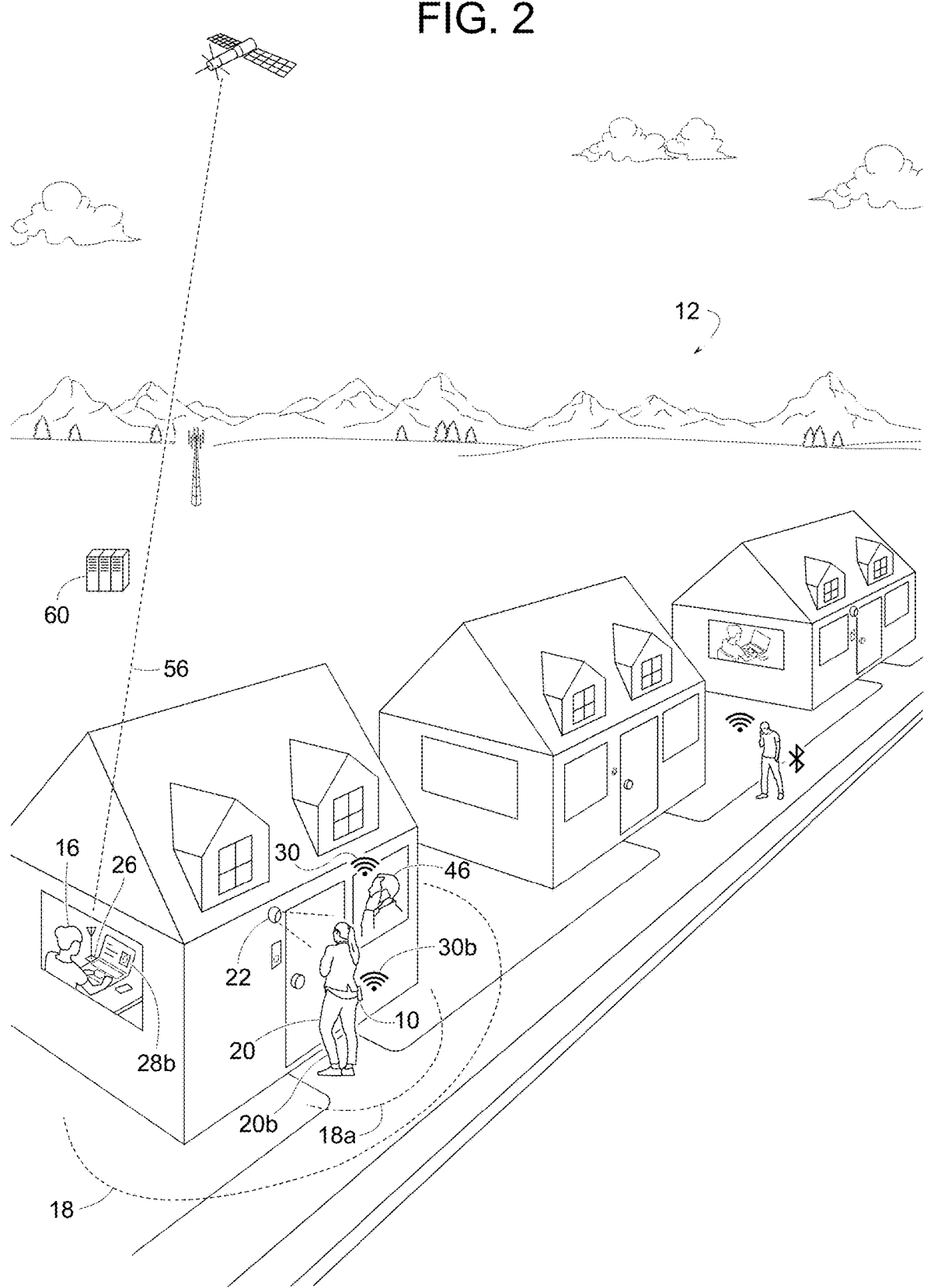
FIG. 2 is a perspective view of the security camera system shown in FIG. 1 but at a second instance of time.
Figure 3:
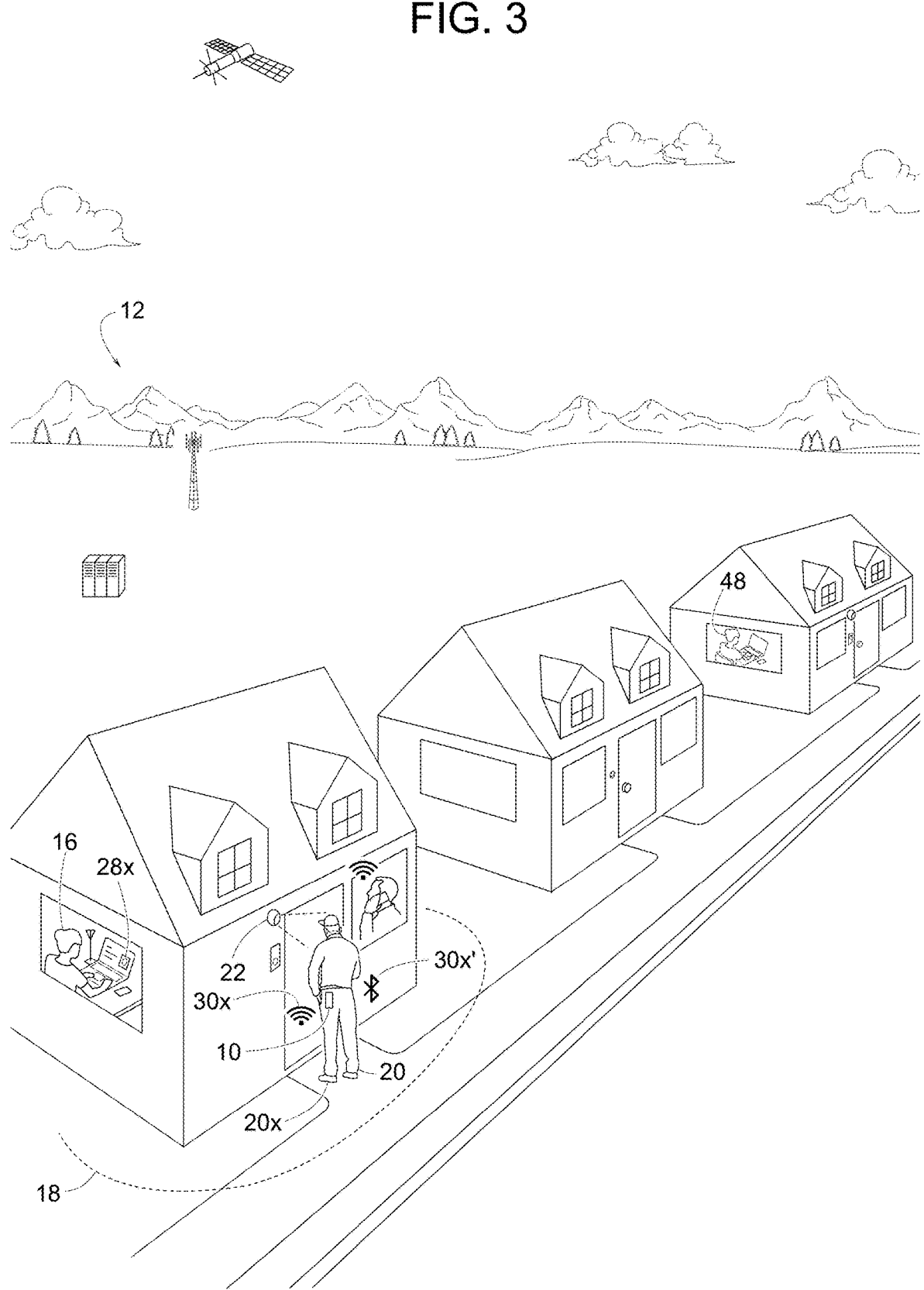
FIG. 3 is a perspective view of the security camera system shown in FIG. 1 but at a third instance of time.

FIGS. 1-3 illustrate examples of security camera system 12 at different instances of time, and FIGS. 4 and 4A-C show functional details of the system 12. The security camera systems 12 can be used to perform the various security camera methods 14a-c shown in FIGS. 5A-5C, 6A-E, and 7A-G.

A resident 16 of an area 18, for example, can use the security camera system 12 to help identify a visitor 20. The term, "resident" refers to any person using or overseeing the security camera system 12 for monitoring the area 18. The resident 16 does not necessarily have to be in the area 18.

To help identify the visitor 20, the security camera system 12 includes a security camera 22 and an internet-enabled device 24 connected in signal communication with a packet scanner 26. The camera 22 captures a digital image 28 of the visitor 20, while the packet scanner 26 detects probe requests 30 transmitted from the visitor's mobile wireless device 10. The term, "mobile wireless device" refers to any handheld electronic apparatus with wireless capability to connect to the Internet 32 either directly or via wireless communication through an intermediate apparatus. Some examples of the mobile wireless device 10 include smartphones, iPhones, Android phones, smart watches, tablets, certain headsets, etc.

Probe requests 30 are radio signals repeatedly emitted by mobile wireless devices 10 as a means for discovering and connecting to available Wi-Fi networks or to other devices (e.g., Bluetooth enabled devices). Probe requests 30 include a plurality of data 32 transmitted in packets 34 or frames. In some examples, the packets 34 transmitted by Wi-Fi enabled devices (e.g., a smartphone 10a) can be IP packets (Internet protocol packets). In some examples, the packets 34 transmitted by Bluetooth enabled devices (e.g., a smart watch 10b) can be advertising packets.

The plurality of data 32, of the packets 34, includes content in a certain arrangement. The content is the actual information of the data 32. The arrangement is the order in which the information is presented. The content and its arrangement provide a digital marker 36 that can help identify a mobile wireless device 10. Together, when paired, the digital marker 36 and the digital image 28 provide a two-part digital ID 38 of the visitor 20.

The term, "two-part digital ID" refers to a digital ID (digital identification) comprising at least one digital image 28 and at least one digital marker 36. Some examples of the two-part digital ID 38 have only one digital image 28 and only one digital marker 36. In some examples, the two-part digital ID 38 has multiple digital images 28 and multiple digital markers 36.

The two-part digital ID 38 is somewhat analogous to a driver's license. A driver's license usually has a picture of the driver with additional identifying textual information, such as a driver's license number, person's name, address, height, weight, eye color, etc.

While not a perfect parallel, the driver's license number could correspond to a randomized or alias MAC address, and the person's address could correspond to an IP address. The person's height, weight and eye color could correspond to miscellaneous information about the mobile digital device, such as the device name, UUIDs (universally unique identifier), previously connected SSIDs (service set identifier), Wi-Fi channel capabilities, signal strength, packet length, TTL (time to live), etc.

Continuing with this loose analogy, the person's social security number could correspond to a permanent, true MAC address. Like a social security number, a true MAC address is an excellent, traceable identifier. For security and privacy, however, a social security number is not usually on a driver's license, just as a true MAC address is not always transmitted in a probe request.

The probe requests 30 (e.g., probe requests 30a, 30b and 30x) are detected by the packet scanner 26. Probe requests 30 is schematically illustrated to represent various probe requests 30 at different times, e.g., a first probe request 30a from a first visitor 20a, a second probe request 30b from a second visitor 20b, and a third probe request 30x from a mystery visitor 20x. The term, "packet scanner" refers to any device or group of devices for detecting, reading, intercepting or sniffing probe requests 30 (Wi-Fi, Bluetooth classic, and/or Bluetooth low energy).

FIGS. 1-3 shows an example sequence of how the resident 16 can use the packet scanner 26 and the camera 22 for monitoring the area 18 for the presence or movement of visitors 20 (e.g., the first visitor 20a, the second visitor 20b, and the mystery visitor 20x). In some examples, the area 18 covers a distance of up to thirty meters from the security camera 22 doing the monitoring. In some examples, the area 18 covers a distance of less than thirty meters from the security camera 22. In some examples, the area 18 covers a distance of more than thirty meters from the security camera 22.

FIG. 1 shows the security camera 22 detecting and capturing a first digital image 28a of the first visitor 20a in the area 18. In this example, the first visitor 20a has a mobile wireless device 10 (e.g., a smartphone 10a) in their back pocket and another mobile wireless device 10 (e.g., a smart watch 10b) on their wrist. In other examples, the first visitor 20a has only one mobile wireless device 10. In some examples, the security camera 22 detecting the first visitor 20a defines a first event at a first instance of time and triggers the internet-enable device 24 to record probe requests 30a detected by the packet scanner 26 proximate the first instance of time. The term, "proximate" with reference to time means within five or ten minutes.

In some but not all examples, the camera's distance range of detection of the presence or movement of a visitor 20 is less than the packet scanner's distance range of detection of probe requests 30. So while the camera 22 might detect a single visitor 20, in some examples, the packet scanner 26 might detect numerous probe requests 30 (multiplicity of probe requests 30).

In some examples, the security camera system 12 filters the numerous probe requests 30 to distinguish which one, or multiple ones, pertains to the first visitor 20a and which ones are irrelevant. Irrelevant ones might be those transmitting weak probe request signals (relatively low transmission signal strength) due to a relatively great distance between the mobile wireless device 10 and the packet scanner 26. Weaker signals with low transmission signal strength, for example, might come from a distant pedestrian 40 or a random vehicle 42 driving by. In some examples, some allowance is given to generally weak Bluetooth probe requests 30' versus the normally stronger Wi-Fi probe requests 30. In some examples, transmission signal strength can be relatively low due to the packet scanner 26 having electromagnetic shielding (FIGS. 8 and 9) that at least partially blocks probe requests 30 coming from untargeted directions. In such examples, the internet-enabled device 24 distinguishes relevant probe requests 30 from irrelevant ones by virtue of the packet scanner's electromagnetic shielding.

In some examples, probe requests 30 might be disregarded based on how often they've been detected prior to the first event. Probe requests 30 from a delivery truck 44, for example, might be disregarded or labeled by the resident 16 as a known delivery truck 44, such as Amazon, FedEx, UPS, USPS, etc. Other frequently detected probe requests 30 and 30' can come from numerous Wi-Fi or Bluetooth enabled devices in the area 18 but are unrelated to the first visitor 20a. A few examples of such devices include smartphones, laptops, and tablets of family members 46; wireless printers, thermostats, speakers, and TVs in the home; and Internet-of-Things devices (e.g., smart locks, smart light bulbs, etc.).

Once the right probe request (e.g., 30a and/or 30a') is identified, its digital marker 36a (content and arrangement) can be paired with the visitor's digital image 28a to create a first two-part digital ID 38a. The first two-part digital ID 38a can be stored for future reference. The term, "pair" simply means acknowledging that the image 28a and the marker 36a are related.

In some examples, the first two-part digital ID 38a can be shared with a neighbor or a community member 48. The community member 48 can be someone that has a similar security camera system 12, and sharing occurs over the Internet 32. In some examples, the location of the community member 48 is limited to within 5 kilometers of the resident 16, thereby keeping the sharing of information limited to only those people that would be most interested. In some examples, the resident 16 and the community member 48 both purchase subscriptions to an information sharing program offered by the company that provides the security camera system 12. The sharing program enables the resident 16 and other community members 48 to keep each other abreast of suspicious activity in the neighborhood.

FIG. 2 shows the security camera 22 detecting and capturing a second digital image 28b of the second visitor 20b in the area 18. In this example, the second visitor 20b has a mobile wireless device 10 (e.g., a smartphone 10a) clipped to their right side. In some examples, the second visitor 20b has more than one mobile wireless device 10. In some examples, the security camera 22 detecting the second visitor 20b defines a second event at a second instance of time and triggers the internet-enable device 24 to record probe requests 30b detected by the packet scanner 26 proximate the second instance of time.

Once the right probe request 30b is identified (e.g., by filtering means already described), the second digital marker 36b of the probe request 30b can be paired with the second visitor's digital image 28b to create a second two-part digital ID 38b of the second visitor 20b. The second two-part digital ID 38b can be stored for future reference. In some examples, the resident 16 has an option to share the second two-part digital ID 38b with the community member 48.

FIG. 3 shows the security camera 22 detecting and capturing a third digital image 28x of the mystery visitor 20x in the area 18. In some examples, the security camera 22 detecting the mystery visitor 20x defines a third event at a third instance of time and triggers the internet-enable device 24 to record the probe request (e.g., 30x and/or 30x') detected by the packet scanner 26 proximate the third instance of time. Each of the probe requests 30a, 30a', 30b, 30x, and 30x' includes a plurality of data 32, but the plurality of data 32 might be different in each probe request 30. The first probe requests 30a and/or 30a' might include a first plurality of data 32a, the second probe request 30b might include a second plurality of data 32b, and the third probe request 30x and/or 30x' might include a third plurality of data 32x.

For the third event, once the right probe request (e.g., 30x and/or 30x') is identified (e.g., by filtering means already described), the third digital marker 36x of the probe request 30x and/or 30x' can be paired with the mystery visitor's digital image 28x to create a third two-part digital ID 38x of the mystery visitor 20x.

In some examples, the internet-enabled device 24 compares the third digital marker 36x to the first and second digital markers 36a and 36b to see if there is sufficient similarity to infer that the mystery visitor 20x is the same as the first visitor 20a or the second visitor 20b. If not, then in some examples, the internet-enabled device 24 concludes that the mystery visitor 20x is someone new, someone other than the first or second visitor 20a or 20b.

Regardless, the third two-part digital ID 38x can be stored for future reference. In some examples, the resident 16 has an option to share the third two-part digital ID 38x with the community member 48.

Some examples of the security camera system 12 can be configured and used as schematically illustrated in FIGS. 4, 4A, 4B and 4C. In some examples, the security camera system 12 comprises the internet-enabled device 24, the security camera 22, and the packet scanner 26. A main modem 50, an optional secondary modem 52, and a router 54 connect the internet-enable device 24 in signal communication with the Internet 32 via a communication link 56. Another communication link 58 connects the security camera 22 in signal communication with the internet-enabled device 24. In some examples, the Internet 32 is accessible by a server 60, which can be used by a company that makes, sells, or is otherwise associated with the security camera 22.

In some examples, the internet-enabled device 24 includes the server 60. Some examples of the server 60 include an actual physical machine, a virtual machine, and/or software performing server functions.

For sake of example, one mobile wireless device 10a is illustrated as a smartphone with both Wi-Fi and Bluetooth signal communication, and another mobile wireless device 10b is shown as a smart watch with Bluetooth. In some examples, both mobile wireless devices 10a and 10b are Wi-Fi and Bluetooth enabled. In some examples, the visitor 20 might have just one mobile wireless device 10, e.g., mobile wireless device 10a or 10b. In some examples, the visitor 20 might have multiple mobile wireless devices 10, e.g., mobile wireless devices 10a and 10b. In some examples, a visitor's mobile wireless devices 10a and 10b are in communication with each other, and such intercommunication can be sniffed or detected by the packet scanner 26. The term, "mobile wireless system" refers to at least one mobile wireless device 10, e.g., mobile wireless device 10a and/or 10b. Dashed lines 62 represent Wi-Fi and/or Bluetooth radio waves being transmitted wirelessly between the packet scanner 26 and the mobile wireless device 10a and/or 10b.

The internet-enabled device 24 is schematically illustrated to represent any single apparatus (e.g., a local computer within physical reach of the resident 16) or a combination of multiple apparatuses (e.g., a local computer plus a remote server) with the ability to access the Internet 32 either directly or through another device acting as a gateway or intermediary. Some examples of the internet-enable devices 24 include computers, PCs, desktop computers, laptops, tablets, PLC (programmable logic device), certain home automation systems, certain security cameras, and smartphones (e.g., mobile wireless devices such as iPhones and Android phones). In some examples, the internet-enabled device 24 includes a tangible computer readable storage medium 64 storing, in a non-transitory state, an executable program code 66 for performing one or more steps of the security camera methods 14a-c. In some examples, at least some of the executable program code 66 is stored on the internet-enabled device 24, wherein the internet-enabled device 24 is in the form of a local computer (e.g., within physical reach of the resident 16). In some examples, at least some of the executable program code 66 is stored on the internet-enabled device 24 in the form of a remote server (e.g., the server 60).

The security camera 22 is schematically illustrated to represent any single apparatus or combination of multiple apparatuses with the ability to capture a digital image (e.g., one or more pictures or video) in response to being triggered by the presence or motion of a visitor 20 within a predetermined distance in front of the security camera 22. Some example producers of the security camera 22 alone, without an integral packet scanner, include Anker Innovations Limited (e.g., Eufy) headquartered in Shenzhen, China; Arlo Technologies, Inc. (formerly a subsidiary of Netgear, now independent) headquartered in San Jose, California; Axis Communications headquartered in Lund, Sweden; Blink Home Security (subsidiary of Amazon) headquartered in Andover, Massachusetts; Bosch Security Systems headquartered in Grasbrunn, Germany; Canon Inc. headquartered in Tokyo, Japan; Dahua Technology headquartered in Hangzhou, China; FLIR Systems headquartered in Wilsonville, Oregon; Hanwha Techwin headquartered in Seoul, South Korea; Hikvision headquartered in Hangzhou, China; Honeywell Security headquartered in Charlotte, North Carolina; Nest Labs (subsidiary of Alphabet Inc., known as Google) headquartered in Palo Alto, California; Panasonic Corporation headquartered in Kadoma, Osaka, Japan; Pelco headquartered in Fresno, California; Reolink Digital Technology Co. Ltd. headquartered in Hong Kong, China; Ring LLC (subsidiary of Amazon) headquartered in Santa Monica, California; Sony Corporation headquartered in Tokyo, Japan; Swann Communications headquartered in Melbourne, Australia; TP-Link Corporation Limited (Tapo) headquartered in Shenzhen, China; Ubiquiti Inc. (Unifi) headquartered in New York City, New York; Vivotek Inc. headquartered in Taipei, Taiwan; Wyze Labs, Inc. headquartered in Seattle, Washington; Xiaomi Corporation headquartered in Beijing, China; and Zmodo Technology Corporation headquartered in Champaign Illinois.

The packet scanner 26 is schematically illustrated to represent any device for detecting signals (e.g., Wi-Fi probe requests 30 or Bluetooth probe requests 30') transmitted by a mobile wireless device 10, such as a smartphone 10a, a smart watch 10b, headsets, and HIDs (human interface devices). Some examples of the packet scanner 26 include a single antenna 68, while other examples include multiple antennas 68. In some examples, multiple antennas 68 can provide various benefits, such as improving signal reception, transmitting and receiving multiple data streams simultaneously, beamforming, and diversity combining.

Transmissions of Wi-Fi probe requests 30 are typically in the 2.4 GHz or 5 GHz frequency bands. In some examples, the data rates of Wi-Fi probe requests 30 are up to 9.6 Gbps. Transmissions of Bluetooth probe requests 30', including BLE (Bluetooth Low Energy) are typically at 2.4 GHz. In some examples, the data rates of conventional or classic Bluetooth probe requests 30' are up to 24 Mbps. In some BLE examples, the data rates of Bluetooth probe requests 30' are only up to 2 Mbps. Further development might lead to changes in the currently normal frequency and data rates.

In some examples, the transmitted Wi-Fi and Bluetooth signals from mobile wireless devices 10 include a plurality of data 32 grouped in one or more packets 34, In some examples of Wi-Fi, the packets 34 can be IP packets (Internet Protocol packets) with frames (e.g., management frames, control frames, and data frames). In some examples of Bluetooth, the packets 34 can be PDUs (Bluetooth Protocol Data Units). In some examples, a packet 34 is one of many transmitted during communication between the mobile wireless device 10 and the packet scanner 26. In some examples, a packet 34 is one of many transmitted during interactive communication between two mobile wireless devices 10 (e.g., between devices 10a and 10b), wherein the packet 34 is intercepted or sniffed by the packet scanner 26.

In some examples, the packets 34 are probe requests 30. Some example probe requests 30 broadcast that the mobile wireless device 10 is searching for an available Wi-Fi network connection (hotspot or access point). Some example probe requests 30 broadcast that the mobile wireless device 10 (e.g., smart watch 10b) is looking to communicate with a compatible Bluetooth device (e.g., smartphone 10a). In some examples, the probe request 30 is transmitted automatically and repeatedly. In some examples, the probe request 30 from the mobile wireless device 10 is transmitted in response to polling from another device, e.g., in response to a beacon frame 35 transmitted by the internet-enabled device 24.

Figure 8:
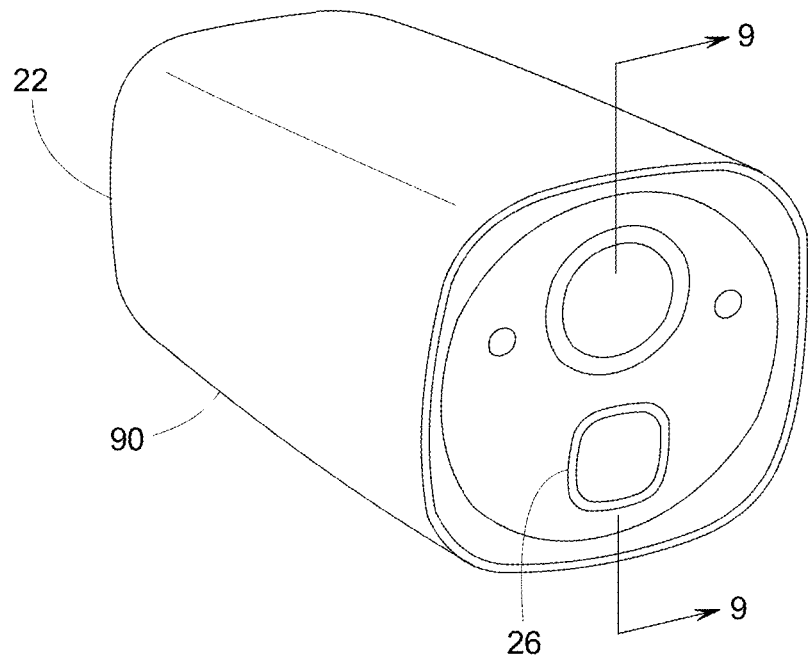
FIG. 8 is a perspective view of an example security camera and example packet scanner that could be used in the example security camera systems and methods disclosed herein.
Figure 9:
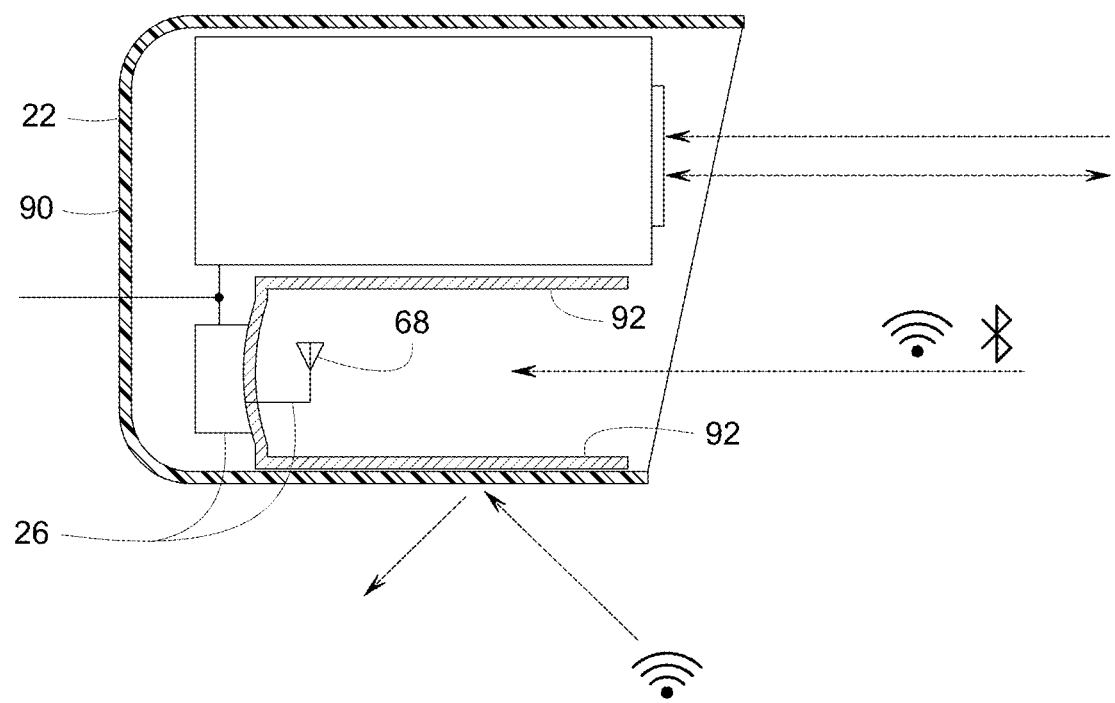
FIG. 9 is a cross-sectional view taken along line 9-9 of FIG. 8.

In some examples, the packet scanner 26 is a wireless Wi-Fi adapter, sometimes known as a WNIC (wireless network interface controller). In some examples, the packet scanner 26 is a sniffer (wireless Wi-Fi adapter in monitor mode). In addition or alternatively, some examples of packet scanner 26 are in the form of a dongle that connects to a port of the internet-enabled device 24. In some examples, the packet scanner 26 is an internal card or chip directly incorporated in the internet-enabled device 24 (e.g., the resident's computer or smartphone). In some examples, the packet scanner 26 is directly incorporated in the security camera 22 (FIGS. 8 and 9). Some examples of packet scanner 26 include Wi-Fi scanners, Bluetooth scanners, and combination Wi-Fi and Bluetooth scanners (e.g., multi-protocol packet scanners). Some specific examples of the packet scanner 26 alone, without the security camera 22, include Wireshark (formerly Ethereal) developed as an open-source project; AirMagnet WiFi Analyzer by NETSCOUT Systems, Inc. of Westford, Massachusetts; Acrylic WiFi by Tarlogic Security of Madrid, Spain; Ellisys Bluetooth Explorer produced by Ellisys of Geneva, Switzerland; Frontline Bluetooth Protocol Analyzer by Teledyne LeCroy of Chestnut Ridge, New York; Packet Sniffer for Bluetooth LE developed as an open-source project; MetaGeek Eye P.A. and MetaGeek Wi-Spy Air by MetaGeek, LLC of Boise, Idaho; Ekahau Spectrum Analyzer and Ekahau Sidekick by Ekahau, Inc. of Reston, Virginia; WiPry 2500x by Oscium of Salt Lake City, Utah; Ubertooth One by Great Scott Gadgets developed as an open-source project; Bluefruit LE Sniffer-Bluetooth Low Energy (BLE 4.0) by Adafruit Industries of New York City, New York; and NodeMCU on an ESP8266 platform developed as an open-source project by Espressif Systems. Other examples might include HackRF One (Bluetooth) and BladeRF.

Many of the aforementioned examples of packet scanner 26 come with software for processing the plurality of data 32 of the transmitted packets 34. In addition or alternatively, Scapy can be used for packet sniffing and analyzing the incoming data 32. Scapy is open-source software distributed under the GNU General Public License and is freely available for use, modification and distribution. Other software examples might include Wireshark, GnuPlot, Graphviz, and VPython.

The data 32 in the packets 34 can vary in content. Some examples of such content include one or more of the following line items (1-27):

(1) a true MAC address (factory or burned-in MAC address) of the mobile wireless device 10;
(2) an alias MAC address of the mobile wireless device 10;
(3) a randomized MAC address of the mobile wireless device 10;
(4) a Bluetooth ID or Bluetooth device address (BD_ADDR);
(5) an RSSI (received signal strength indicator);
(6) a vender identifier IDFA (Identifier for Advertisers);
(7) an advertising identifier AAID (Google advertising ID);
(8) name of the mobile wireless device 10;
(9) CoD (Class of Device) of the mobile wireless device 10;
(10) prior SSIDs (service set identifier, e.g., Starbucks, Joe's Cafe, local library, hotel, etc.) of the mobile wireless device 10 (e.g., an SSID that the mobile wireless device 10 is searching for);
(11) a UAA (universally administered address) of the mobile wireless device 10;
(12) an LAA (locally administered address) of the mobile wireless device 10;
(13) an IP address (Internet Protocol address) directly or via ARP (Address Resolution Protocol providing table of MACs and IP addresses in IPv4) or via NDP (Neighbor Discovery Protocol providing table of MACs and IP addresses in IPv6);
(14) a UUID (universally unique identifier);
(15) a UDID (unique device identifier);
(16) Wi-Fi channels and capabilities;
(17) a list of authentication algorithms supported by the mobile wireless device 10;
(18) a list of encryption algorithms supported by the mobile wireless device 10;
(19) a preferred data rate of the mobile wireless device 10;
(20) a preferred wireless mode (e.g., ad hoc mode or infrastructure mode) of the mobile wireless device 10;
(21) frequency bands (e.g., 2.4 GHz or 5 GHZ) supported by the mobile wireless device 10;
(22) an ICCID (integrated circuit card identifier);
(23) a TMSI (temporary mobile subscriber identity);
(24) an IMSI (international mobile subscriber identity);
(25) a Bluetooth access code for synchronization and access to a channel;
(26) header, payload and trailer; and
(27) a device username, e.g., "Amazon Delivery," "Tyler," "USPS," etc., wherein the username is chosen and entered into the mobile wireless device 10 by the user or owner of the device 10.

The content of the data 32 in a given probe request 30 can vary. The term, "content" refers to which of the line items (1-27) are in a given probe request 30 and further refers to what characters (e.g., letters, numbers, punctuation, upper/lower case, order from left to right, etc.) are in each of the included line items.

The arrangement of the data 32 in a given probe request 30 (including one or more packets 34) can also vary. The term, "arrangement," as it pertains to one or more probe requests 30 with multiple line items, refers to the order in which the line items are laid out or presented. For example, a probe request 30 with one or more packets 34 might include a randomized MAC address of the mobile wireless device 10 (line item 3), prior SSIDs of the mobile wireless device 10 (line item 10), and a preferred data rate of the mobile wireless device 10 (line item 19). The sequential arrangement of such content would be the order in which the line items 3, 10 and 19 were presented or transmitted.

Variation of content and arrangement among probe requests 30 from different mobile wireless devices 10 can help distinguish one mobile wireless device 10 from another. Thus, the first visitor 20a with the first mobile wireless device 10 can be distinguished from the second visitor 20b with the second mobile wireless device 10 without having to rely solely on a picture of each visitor 20a and 20b.

Conversely, similarities of content and arrangement of probe requests 30 can help identify the mystery visitor 20x if the mystery probe request 30x is significantly similar to the probe request 30 of a previously known visitor. In some examples, the resident 16 can be reasonably sure of the mystery visitor's identity even without an exact match or even without knowing the true MAC address of the mystery visitor's mobile wireless device 10.

In some examples, the internet-enable device 24 runs the executable program code 66 to compare the attributes (content or arrangement) of detected probe requests 30 from various mobile wireless devices 10. The comparisons identify similarities and differences to determine whether two probe requests 30 are from the same mobile wireless device 10 or from different devices 10. Some examples of such attributes or points of comparison include the total number of characters in select fields or line items [e.g., line item (5), (8), (10), etc.], the total number of characters in a given probe request 30, the percentage of identical characters found in two probe requests 30 being compared, the length of the longest contiguous string of characters found to be identical or significantly different in two probe requests 30, the total number of fields or line items found to be identical or different in two probe requests 30 (with one or more packets 34), a MAC address 70 found to be the same in two probe requests 30, and the sequential arrangement in which multiple fields or line items were presented or transmitted in different probe requests 30.

These are just a few examples, as there are endless possible ways for comparing the similarity and differences of probe request 30 to determine whether they came from the same mobile wireless device 10 or from two different ones. In some examples, determining two probe requests 30 came from the same mobile wireless device 10 does not require an exact match of two probe requests 30.

Even if the MAC addresses are not identical (e.g., randomized or alias MAC addresses), other matching attributes can still suggest a high likelihood that two probe requests 30 came from the same mobile wireless device 10. In some examples, the internet-enable device 24 provides the resident 16 with a computed value (e.g., 10%, 80%, 90%, etc.) indicating a confidence level that two probe requests 30 come from the same mobile wireless device 10. In some examples, the computed confidence level is 100% if the MAC addresses 70 are a perfect match.

In some examples, computing confidence values, comparing probe requests 30 and executing other functions of the security camera system 12 are performed locally, in the area 18, by the internet-enabled device 24. In some examples, the server 60 performs at least some of the functions remotely, beyond the area 18. In some examples, both the server 60 and the internet-enable device 24 share the workload of performing various functions of the security camera system 12.

In some examples, the internet-enabled device 24 comprises the server 60. So in some examples, part of the internet-enabled device 24 resides locally in the area 18, while another part of the internet-enable device 24 (i.e., the part that functions as the server 60) resides remotely beyond the local area 18.

The server 60 is schematically illustrated to represent any single computing apparatus or combination of multiple computing apparatuses with the ability to process and/or store data. In some examples, the server 60 includes the tangible computer readable storage medium 64 for storing, in a non-transitory state, the executable program code 66 for performing one or more steps of the security camera methods 14*a-c*. In some examples, the server 60 is connected in signal communication with the Internet 32.

In some examples, the main modem 50 is the primary hardware that connects the internet-enabled device 24 to the Internet 32. In some examples, the main modem 50 sends and receives signals from the ISP (Internet service provider), while the router 54 disperses the signals to various devices on the network. In some examples, the communication link 56 connects the main modem 50 of the internet-enabled device 24 in signal communication with the server 60. In some examples, the communication link 56 provides the internet-enabled device 24 with access to the Internet 32. Some examples of the communication link 56 include coaxial cables, fiber-optic cables, cellphone towers 72, radio waves, phone lines (e.g., dial or DSL), satellite 74, and various combinations thereof, etc.

Some examples of the security camera system 12 include the optional secondary modem 52. In some examples, the main modem 50 provides the visitor 20 with access to a more restricted Wi-Fi network (e.g., secured) for friends, family or other trusted visitors 20, while the secondary modem 52 provides the general public or unknown visitors 20 with less restricted Wi-Fi network (e.g., unsecured). In some examples, accessing the more restricted WI-Fi network requires submitting a password or other authentication credentials. In some examples, accessing the less restricted Wi-Fi network does not require a password.

In some examples, offering the less restricted Wi-Fi network invites or encourages unknown visitors 20 to enter a handshake 25 process of exchanging additional packets 34 between the mobile wireless device 10 and the packet scanner 26 after transmitting initial probe requests 30. The additional packets 30 might provide a true MAC address or other content that could help identify the visitor 20.

In some examples, the main modem 50 and the secondary modem 52 are two discrete components. In other examples, the main modem 50 and the secondary modem 52 are combined as a single component partitioned or otherwise configured to provide two Wi-Fi networks.

The router 54 serves as a hub connected in signal communication with the main modem 50, one or more security cameras 22, and various other devices (e.g., the packet scanner 26) associated with the internet-enabled device 24. In some examples, the router 54 combines the functionality of a wireless AP (wireless access point), an Ethernet router, a basic firewall and a small Ethernet switch (e.g., four access points). The term, "wireless access point" is sometimes known as an Internet access point, a Wi-Fi hotspot, a Wi-Fi network, or a cellular network. Some example Wi-Fi networks include LAN (local area network) and WAN (wide area network). In some examples, the router 54 and the modem 50 are combined in a common housing. Is some examples, the router 54 is an integral part of the internet-enabled device 24. In some examples, the router 54 and the internet-enable device 24 are physically separated but connected in signal communication with each other.

In some examples, the communication link 58 and the router 54 connect the security camera 22 in signal communication with the internet-enabled device 24. Some examples of the communication link 58 include a hardwired connection, a wireless connection, Ethernet, PoE (Power over Ethernet), wireless Ethernet bridge, and various combinations thereof, etc.

In some examples, as mentioned earlier, the content and arrangement of data 32 in probe requests 30 and/or 30' can serve as a digital marker 36. Pairing or associating the digital marker 36 with the digital image 28 produces the two-part digital ID 38. The internet-enabled device 24 can readily and automatically pair the digital marker 36 with the digital image 28 because both are sampled at the same event, which is defined by the visitor 20 triggering the security camera 22. Upon creating the two-part digital ID 38, in some examples, the internet-enabled device 24 offers the resident 16 several options pertaining to the two-part digital ID 38, such as a labeling option 76, a rating option 78, and a sharing option 80.

Figure 4:
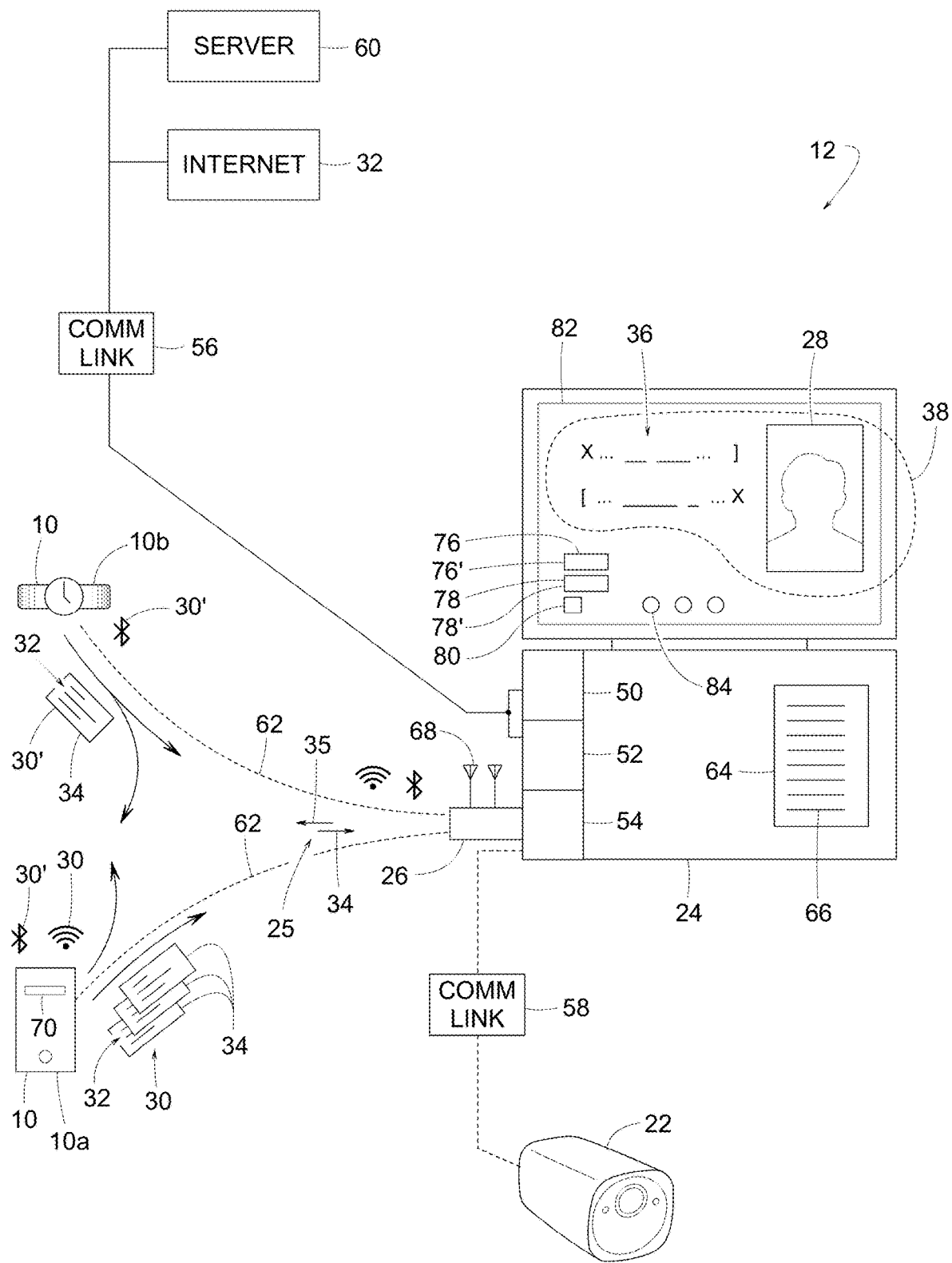
FIG. 4 is a schematic diagram of the security camera system shown in FIGS. 1-3.
Figure 4A:
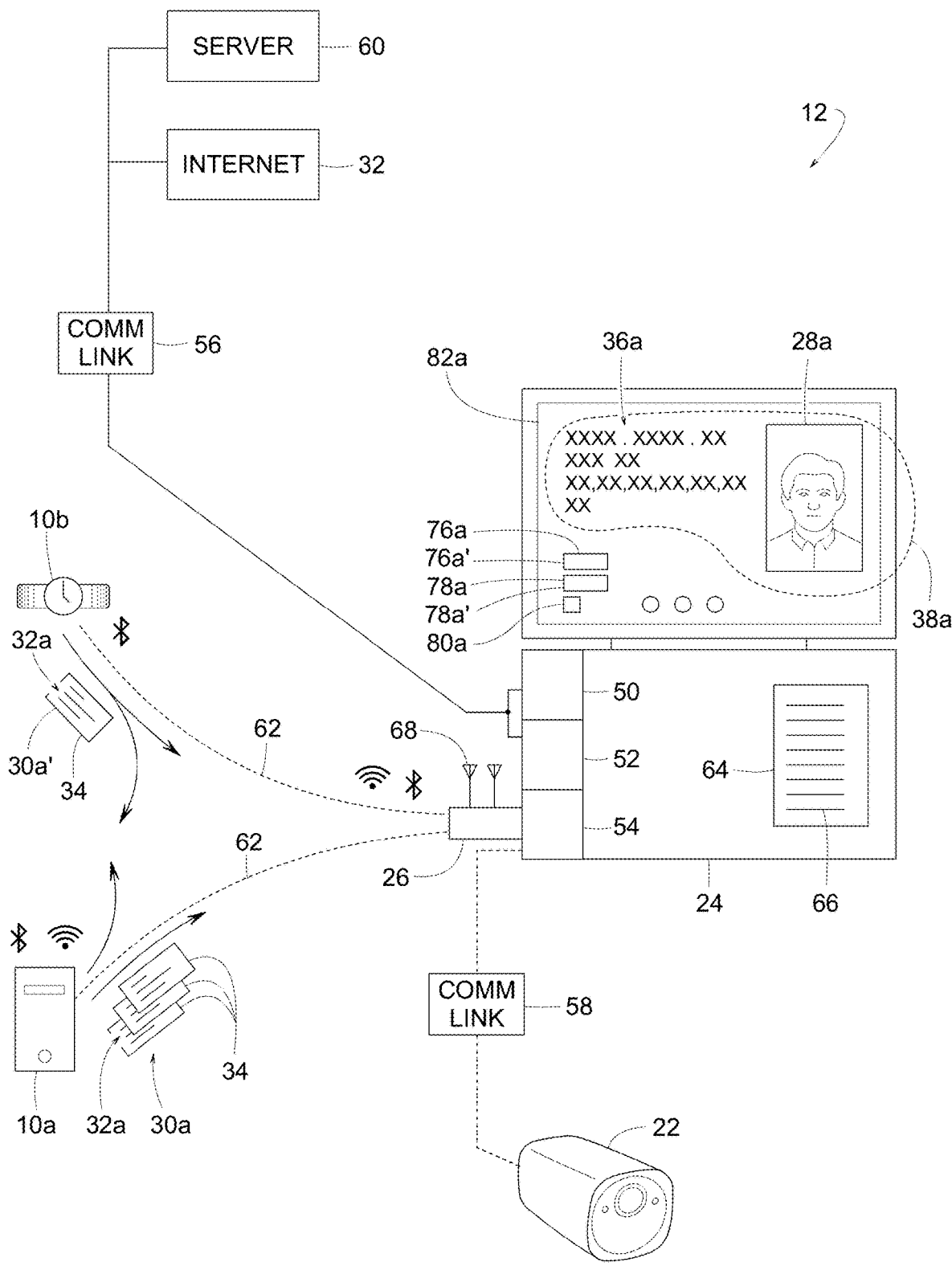
FIG. 4A is a schematic diagram similar to FIG. 4 but specifically corresponding to FIG. 1 at the first instance of time.
Figure 4B:
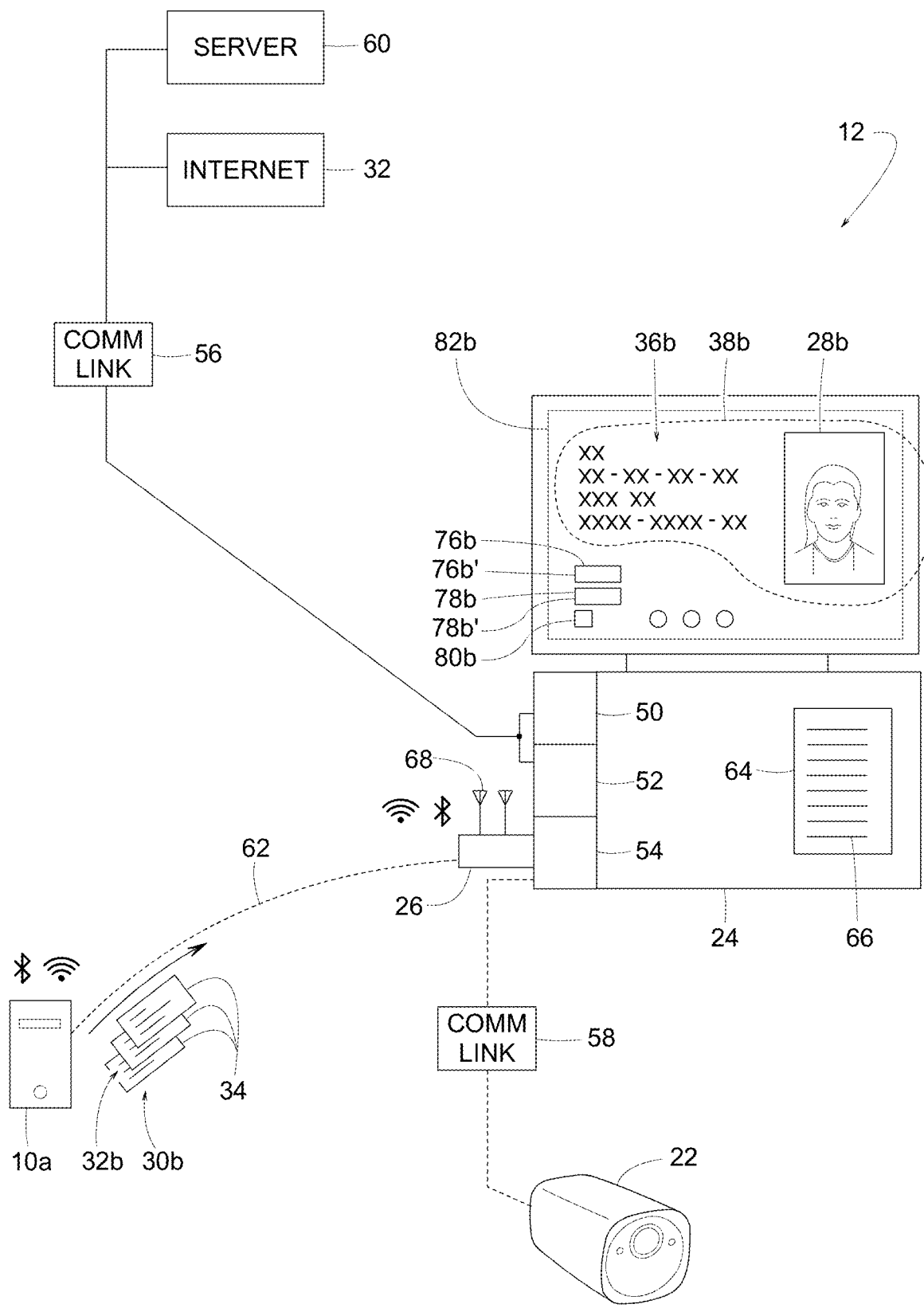
FIG. 4B is a schematic diagram similar to FIG. 4 but specifically corresponding to FIG. 2 at the second instance of time.
Figure 4C:
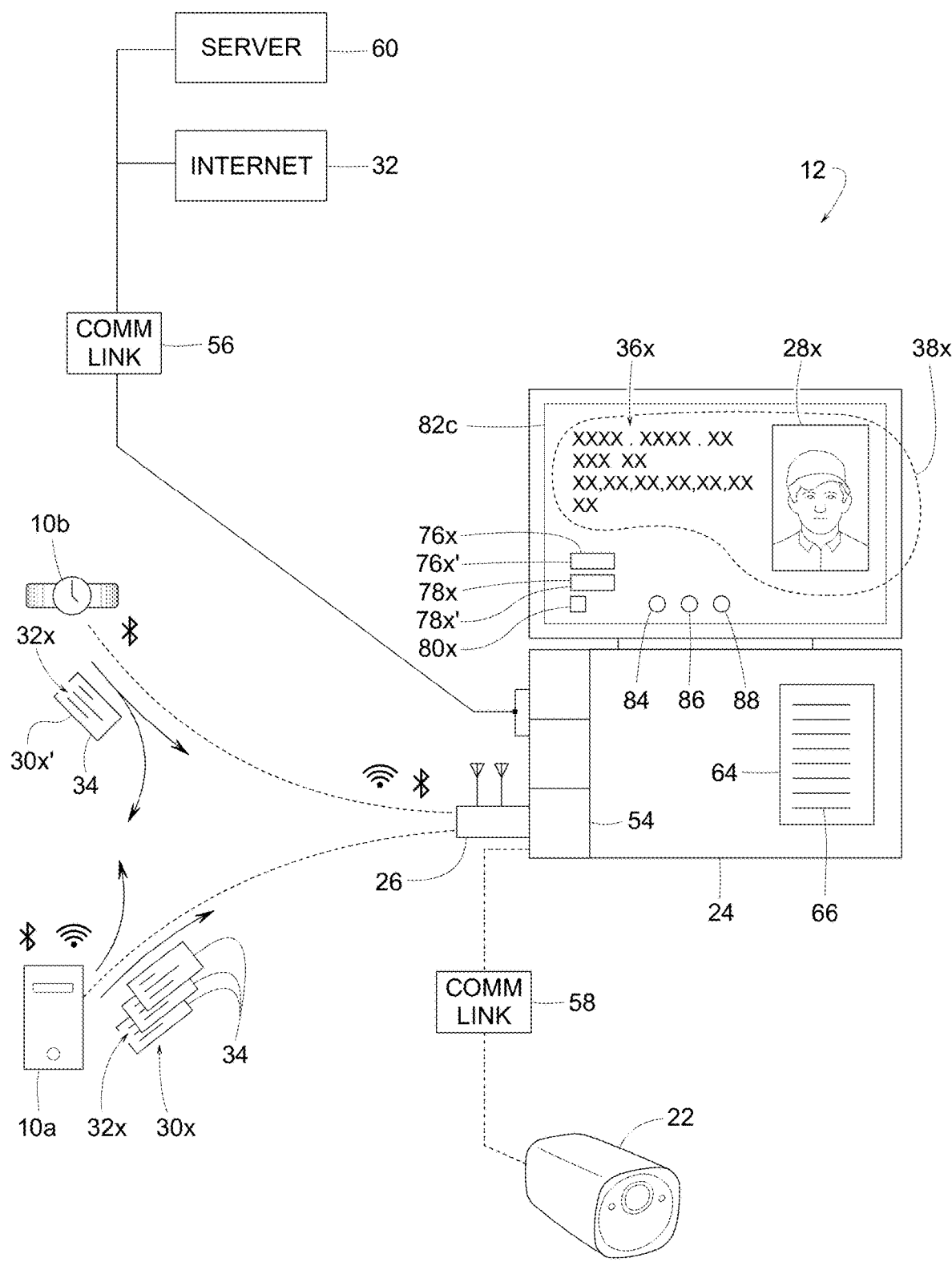
FIG. 4C is a schematic diagram similar to FIG. 4 but specifically corresponding to FIG. 3 at the third instance of time.

The labeling option 76 (and corresponding label 76'), in some examples, the label 76' is a chosen name the resident 16 assigns to the visitor 20 shown in digital image 28 of the two-part digital ID 38. Some example names include, Joe, Mary, Friend, Neighbor, Mail Carrier, Porch Pirate, Unknown Person, etc. It should be noted that FIGS. 4A, 4B and 4C show three example screenshots 82*a*, 82*b* and 82*c*, respectively. Each screenshot 82*a-c* has a corresponding labeling option 76*a*, 76*b* and 76*c*. And each labeling option 76*a-c* has a corresponding label 76*a'*, 76*b'* and 76*c'*.

The rating option 78 (and corresponding rating 78'), in some examples, allows the resident 16 to rank a particular visitor's two-part digital ID 38 or digital images 28 based on how well the resident 16 trusts the visitor 20. In some examples, the rating option 78 is on a scale of one to ten or some other range. In some examples, the rating option 78 is descriptive, such as Trustworthy, Neutral, Suspicious, Very Suspicious, etc. Each screenshot 82*a-c* has a corresponding rating option 78*a*, 78*b* and 78*c*. And each rating option 78*a-c* has a corresponding rating 78*a'*, 78*b'* and 78*c'*.

The sharing option 80 provides the resident 16 with a choice as to whether or not the two-part digital ID 38, digital image 28, label or chosen name, or rank of trustworthiness, etc. should be shared with one or more other community members 48. Sharing such information can provide all participating community members 48 with advance notice when, for example, a very suspicious visitor has returned to the neighborhood. In some examples, the sharing option 80 is simply a checkbox offered by the internet-enabled device 24. Each screenshot 82*a-c* has a corresponding sharing option 80*a*, 80*b* and 80*c*.

FIGS. 5A-5C, 6A-E, and 7A-G illustrate various method steps of the security camera method 14. In some examples, some of the steps are optional and can be omitted. In some examples, some of the steps can be performed in a different sequence. In some examples, some of the steps can be performed concurrently. In some examples, the method steps can be performed by at least one of the security camera system 12, the internet-enabled device 24, the executable program code 66, the packet scanner 26, the security camera 22, the mobile wireless device 10, the server 60, the main modem 50, the secondary modem 52, the router 54, the communication links 56 and 58, the resident 16, the community member 48, and the visitor 20.

In FIG. 5A, block 100 represents monitoring the area 18 with the security camera 22. Block 101 represents monitoring the area 18 with the packet scanner 26. Block 102 represents detecting, via the security camera 22, the visitor 20*a* being in the area 18 at a first instance of time, thereby defining a first event. So, in some examples, but not necessarily all examples, it is the security camera 22 that triggers the process of collecting probe requests 30*a* and executing other actions. Some known example means for detecting the visitor 20*a* include image analysis, PIR (passive infrared sensor), microwave, etc.

Block 104 represents capturing, via the security camera 22, the first digital image 28*a* of the visitor 20*a* in the area 18 at the first instance of time (e.g., FIG. 1). Block 106 represents detecting, via the packet scanner 26, the first probe request 30*a* transmitted from the mobile wireless system 10*a* and/or 10*b* of the visitor 20*a* proximate the first instance of time.

Block 108 represents transmitting, via the packet scanner 26, the MAC address 70 from the mobile wireless device 10 of the visitor 20*a* to the internet-enabled device 24 proximate the first instance of time. In some examples, the MAC address 70 is the true MAC address. In some examples, the MAC address 70 is an alias MAC address. In some examples, the MAC address 70 is a randomized MAC address. In some examples, the MAC address 70 is recognizable as six groups of two hexadecimal digits, which might be separated by hyphens, colons, spaces or without separators.

The term, "true MAC address" refers to a MAC address that is permanently assigned to a mobile digital device 10 prior to a retail sale of the device 10. A true MAC address is sometimes referred to as a factory MAC address or burned-in MAC address. The term, "alias MAC address" refers to an alternate or substitute MAC address that can be transmitted by probe requests while maintaining confidentiality of the true MAC address. Alias MAC addresses are often temporarily stored on the mobile wireless device 10 and can be reused for streamlining the process of connecting to a familiar Wi-Fi network, such as at a frequently visited coffee shop. The term, "randomized MAC address" refers to an arbitrarily generated MAC address. In some examples, an alias MAC address is randomly generated. Block 110 represents storing the first digital image 28*a* of the visitor 20*a* on the internet-enabled device 24.

In FIG. 5B block 112 represents storing the MAC address 70 of the mobile wireless device 10 of the visitor 20*a* on the internet-enabled device 24. In some examples, the MAC address 70 is the true MAC address. In some examples, the MAC address 70 is an alias MAC address. In some examples, the MAC address 70 is a randomized MAC address. Block 114 represents pairing the first digital image 28*a* and the MAC address 70 to create the two-part digital ID 38*a* of the visitor 20*a*.

Block 116 represents offering the resident 16, via the internet-enabled device 24, the labeling option 76*a* to assign a label 76*a'* to the two-part digital ID 38*a* of the visitor 20*a*. Some example names might include, Joe, Mary, Friend, Neighbor, Mail Carrier, Porch Pirate, Unknown Person, etc. Block 118 represents assigning the label 76*a'* to the two-part digital ID 38*a* of the visitor 20*a* via the resident 16 interacting 85 (e.g., mouse click, keypad, keyboard, touchscreen, voice command, etc.) with the internet-enabled device 24.

Block 120 represents detecting, via the security camera 22, the visitor 20*a* being in the area 18 at a second instance of time (e.g., FIG. 3), thereby defining a second event. Block 122 represents capturing, via the security camera 22, a second digital image 28*x* of the visitor 20*a* in the area 18 at the second instance of time.

In FIG. 5C, block 124 represents detecting, via the packet scanner 26, the second probe request 30*x* transmitted from the mobile wireless device 10 of the visitor 20*a* proximate the second instance of time. Block 126 represents transmitting, via the packet scanner 26, the MAC address 70 from the mobile wireless device 10 of the visitor 20*a* to the internet-enabled device 24 proximate the second instance of time. The MAC address might be the true MAC address, an alias MAC address, or a randomized MAC address.

Block 128 represents providing a notice 84 (e.g., a message, signal, etc.) to the resident 16, via the internet-enabled device 24, that the second event is associated with the label 76*a'* of the two-part digital ID 38*a* based at least partially on the MAC address 70 transmitted from the mobile wireless device 10 of the visitor 20*a* to the internet-enabled device 24 proximate the second instance of time. Some examples of notice 84 might include, "Jim's here," or "The solicitor has returned," or "The mail carrier is at the door," or "The porch pirate is back."

Block 130 represents distinguishing, via at least one of the packet scanner 26 and the internet-enabled device 24, the first probe request 30*a* among the multiplicity of probe requests 30 based at least partially on a transmission signal strength between the packet scanner 26 and the first mobile wireless device 10. In some examples, the transmission signal strength is diminished due to a great distance between the source of the probe request 30 and the packet scanner 26. In some examples, the transmission signal strength is diminished due to the packet scanner 26 having a shield that at least partially blocks the probe request 30.

Block 132 represents distinguishing, via at least one of the packet scanner 26 and the internet-enabled device 24, the first probe request 30a among the multiplicity of probe requests 30 based at least partially on how often each of the multiplicity of probe requests 30 are detected by the packet scanner 26 prior to the first instance of time. In some examples, probe requests 30 that are detected very often (e.g., every hour or every ten minutes) and over an extended period prior to the first instance of time are disregarded as coming from a source well known to the resident 16 rather than from a visitor 20.

In FIG. 6, block 134 represents monitoring the area 18 with the security camera 22. Block 136 represents monitoring the area 18 with the packet scanner 26. In some examples, the packet scanner 26 is sniffing for Wi-Fi and/or Bluetooth signals transmitted by one or more mobile wireless devices 10. Block 138 represents detecting, via the security camera 22, the first visitor 28a (e.g., Tyler) being in the area 18 at a first instance of time (FIG. 1). Block 140 represents capturing, via the security camera 22, a first digital image 28a of the first visitor 20a in the area 18 at the first instance of time, e.g., at 8 AM on Tuesday. Block 142 represents detecting, via the packet scanner 26, the first probe request 30a transmitted from the first mobile wireless system 10a and/or 10b of the first visitor 20a, wherein the first probe request 30a is one among a multiplicity of probe requests 30 that happen proximate the first instance of time, the first probe request 30a includes a first plurality of data 32a having a first content in a first arrangement that provides a first digital marker 36a of the first visitor 20a.

In FIG. 6B, block 144 represents distinguishing, via at least one of the internet-enabled device 24 and the packet scanner 26, the first probe request 30a from among the multiplicity of probe requests 30 based at least partially on one of the following:
 a) a transmission signal strength between the packet scanner 26 and the first mobile wireless system 10a and/or 10b, and
 b) how often each of the multiplicity of probe requests 30 are detected by the packet scanner 26 prior to the first instance of time (prior to FIG. 1).

Block 146 represents storing the first digital image 28a of the first visitor 20a on at least one of the security camera 22 and the internet-enabled device 24. In some examples, the internet-enabled device 24 includes the server 60. Block 148 represents storing the first digital marker 36a of the first visitor 20a on at least one of the security camera 22 and the internet-enabled device 24. Block 150 represents pairing the first digital image 28a of the first visitor 20a and the first digital marker 36a of the first visitor 20a to create a first two-part digital ID 38a of the first visitor 20a. So, in some examples, the first two-part digital ID 38a is a combination of the first digital image 28a and the first digital marker 36a, wherein the first digital marker 36a, in some examples, is the content and/or arrangement of the plurality of data 32a in the probe request 30a. Block 152 represents detecting, via the security camera 22, the second visitor 20b (e.g., Ashia) being in the area 18 at a second instance of time, e.g., 11 AM on Wednesday (FIG. 2). Block 154 represents capturing, via the security camera 22, a second digital image 28b of the second visitor 20b in the area 18 at the second instance of time.

In FIG. 6C, block 156 represents detecting, via the packet scanner 26, the second probe request 30b transmitted from the second mobile wireless system 10a and/or 10b of the second visitor 20b, wherein the second probe request 30b happens proximate the second instance of time, and the second probe request 30b includes a second plurality of data 32b having a second content in a second arrangement that provides a second digital marker 36b of the second visitor 20b. Block 158 represents storing the second digital image 28b of the second visitor 20b on at least one of the security camera 22 and the internet-enabled device 24. Block 160 represents storing the second digital marker 36b of the second visitor 20b on the internet-enabled device 24. Block 162 represents pairing the second digital image 28b of the second visitor 20b and the second digital marker 36b of the second visitor 20b to create a second two-part digital ID 38b of the second visitor 20b. Block 164 represents detecting, via the security camera 22, the mystery visitor 20x being in the area 18 at a third instance of time (e.g., 10 PM on Thursday). The mystery visitor 20x might be Tyler, Ashia, or someone else. Block 166 represents capturing, via the security camera 22, a third digital image 28x of the mystery visitor 20x in the area 18 at the third instance of time.

In FIG. 6D, block 168 represents detecting, via the packet scanner 26, the mystery probe request 30x transmitted from the mystery mobile wireless system 10a and/or 10b of the mystery visitor 20x, wherein the mystery probe request 30x excludes the true MAC address of the mystery mobile wireless system 10a and/or 10b, thereby preserving some privacy of the mystery visitor 20x; the mystery probe request 30x happens proximate the third instance of time, and the mystery probe request 30x includes a third plurality of data 32x having a third content in a third arrangement that provides a third digital marker 36x of the mystery visitor 20x. Although the true MAC address is excluded, an alias MAC address or randomized MAC address might be included, transmitted and sniffed.

Block 170 represents storing the third digital image 28x of the mystery visitor 20x on at least one of the security camera 22 and the internet-enabled device 24. Block 172 represents storing the third digital marker 36x of the mystery visitor 20x on the internet-enabled device 24. Block 174 represents pairing the third digital image 28x of the mystery visitor 20x and the third digital marker 30x of the mystery visitor 20x to create a third two-part digital ID 38x of the mystery visitor 20x. Block 176 represents determining, via the internet-enable device 24, a first degree of similarity between the third digital marker 36x and the first digital marker 36a. In some examples, the degree of similarity is based on how closely the content or arrangement of the digital markers 36a and 36x compare. Block 178 represents inferring, via the internet-enable device 24, whether or not the first degree of similarity suggests that the mystery visitor 20x is the first visitor 20a. The closer the digital markers 36a and 36x match, the greater the likelihood that the digital markers 36a and 36x represent the same person.

In FIG. 6E, block 180 represents offering the resident 16, via the internet-enable device 24, at least one of the following three options:
 a) a first labeling option 76a to assign a first label 76a' to the first visitor 20a;
 b) a first rating option 78a to assign a first security rating 78a' to the first visitor 20a, wherein the first security rating 78a' indicates how well the resident 16 trusts the first visitor 20a; and
 c) a first sharing option 80a that indicates whether or not the internet-enabled device 24 is to share the first two-part digital ID 38a of the first visitor 20a with the community member 48.

Block 182 represents adding the third two-part digital ID 38*x* to the first two-part digital ID 38*a* when the internet-enable device 24 infers that the first degree of similarity suggests that the mystery visitor 20*x* is the first visitor 20*a*. Block 184 represents providing the resident 16, via the internet-enabled device 24, an alert 84 indicating that the mystery visitor 20*x* is the first visitor 20*a* when the internet-enable device 24 infers that the first degree of similarity suggests that the mystery visitor 20*x* is the first visitor 20*a*, wherein the alert 84 indicates at least one of the first label 76*a'* and the first security rating 78*a'* applies to the mystery visitor 20*x*.

In FIG. 7A, block 186 represents monitoring the area 18 with the security camera 22. Block 188 represents monitoring the area 18 with the packet scanner 26. Block 190 represents detecting, via the security camera 22, the first visitor 20*a* (e.g., Tyler) being in the area 18 at a first instance of time (FIG. 1). Block 200 represents capturing, via the security camera 22, a first digital image 28*a* of the first visitor 20*a* in the area 18 at the first instance of time.

Block 202 represents detecting, via the packet scanner 26, the first probe request 30*a* transmitted from the first mobile wireless system 10*a* and/or 10*b* of the first visitor 20*a*, wherein the first probe request 30*a* happens proximate the first instance of time, and the first probe request 30*a* includes a first plurality of data 32*a* having a first content in a first arrangement that provides a first digital marker 36*a* of the first visitor 20*a*.

Block 204 represents storing the first digital image 28*a* of the first visitor 20*a* on the internet-enabled device 24. Block 206 represents storing the first digital marker 36*a* of the first visitor 20*a* on the internet-enabled device 24. Block 208 represents pairing the first digital image 28*a* of the first visitor 20*a* and the first digital marker 36*a* of the first visitor 20*a* to create a first two-part digital ID 38*a* of the first visitor 20*a*.

Figure 7B:
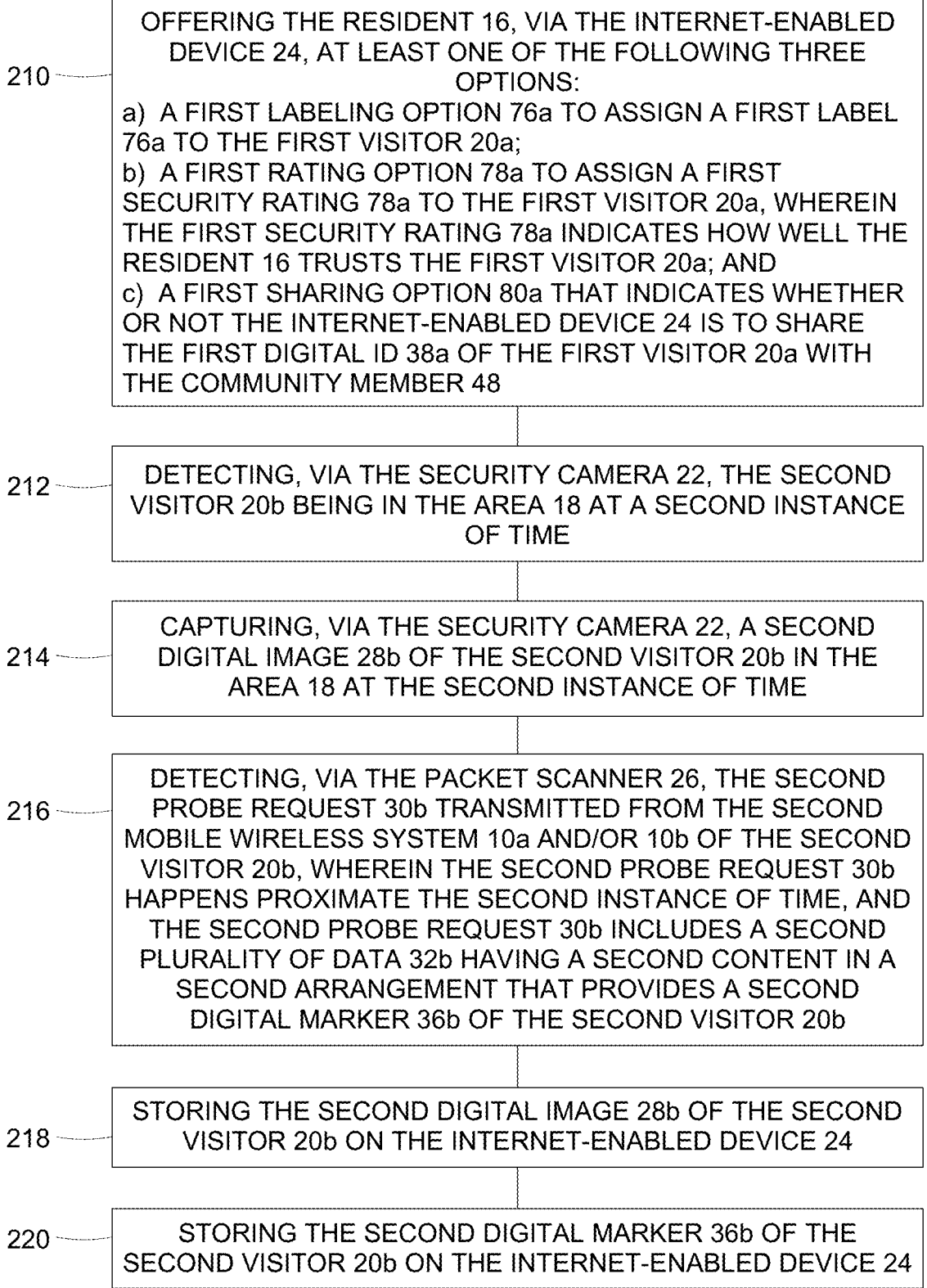
FIG. 7B is a flow diagram continuing from the bottom of FIG. 7A and illustrating various steps of the security camera method.

In FIG. 7B, block 210 represents offering the resident 16, via the internet-enabled device 24, at least one of the following three options:
a) a first labeling option 76*a* to assign a first label 76*a'* to the first visitor 20*a*;
b) a first rating option 78*a* to assign a first security rating 78*a'* to the first visitor 20*a*, wherein the first security rating 78*a'* indicates how well the resident 16 trusts the first visitor 20*a*; and
c) a first sharing option 80*a* that indicates whether or not the internet-enabled device 24 is to share the first two-part digital ID 38*a* of the first visitor 20*a* with the community member 48.

Block 212 represents detecting, via the security camera 22, the second visitor 20*b* (e.g., Ashia) being in the area 18 at a second instance of time (FIG. 2). Block 214 represents capturing, via the security camera 22, a second digital image 28*b* of the second visitor 20*b* in the area 18 at the second instance of time. Block 216 represents detecting, via the packet scanner 26, the second probe request 30*b* transmitted from the second mobile wireless system 10*a* and/or 10*b* of the second visitor 20*b*, wherein the second probe request 30*b* happens proximate the second instance of time, and the second probe request 30*b* includes a second plurality of data 32*b* having a second content in a second arrangement that provides a second digital marker 36*b* of the second visitor 20*b*. Block 218 represents storing the second digital image 28*b* of the second visitor 20*b* on the internet-enabled device 24. Block 220 represents storing the second digital marker 36*b* of the second visitor 20*b* on the internet-enabled device 24.

In FIG. 7C, block 222 represents pairing the second digital image 28*b* of the second visitor 20*b* and the second digital marker 36*b* of the second visitor 20*b* to create a second two-part digital ID 38*b* of the second visitor 20*b*. Block 224 represents offering the resident 16, via the internet-enabled device 24, at least one of the following three options:
a) a second labeling option 76*b* to assign a second label 76*b'* to the second visitor 20*b*;
b) a second rating option 78*b* to assign a second security rating 78*b'* to the second visitor 20*b*, wherein the second security rating 78*b'* indicates how well the resident 26 trusts the second visitor 20*b*; and
c) a second sharing option 80*b* that indicates whether or not the internet-enabled device 24 is to share the second two-part digital ID 38*b* of the second visitor 20*b* with the community member 48.

Block 226 represents detecting, via the security camera 22, the mystery visitor 20*x* being in the area 18 at a third instance of time (FIG. 3). The mystery visitor 20*x*, in some examples, might be Tyler, Ashia, or someone else. Block 228 represents capturing, via the security camera 22, a third digital image 28*x* of the mystery visitor 20*x* in the area 18 at the third instance of time. Block 230 represents detecting, via the packet scanner 26, the mystery probe request 30*x* transmitted from the mystery mobile wireless system 10*a* and/or 10*b* of the mystery visitor 20*x*, wherein the mystery probe request 30*x* happens proximate the third instance of time, and the mystery probe request 30*x* includes a third plurality of data 32*x* having a third content in a third arrangement that provides a third digital marker 36*x* of the mystery visitor 20*x*.

Figure 7D:
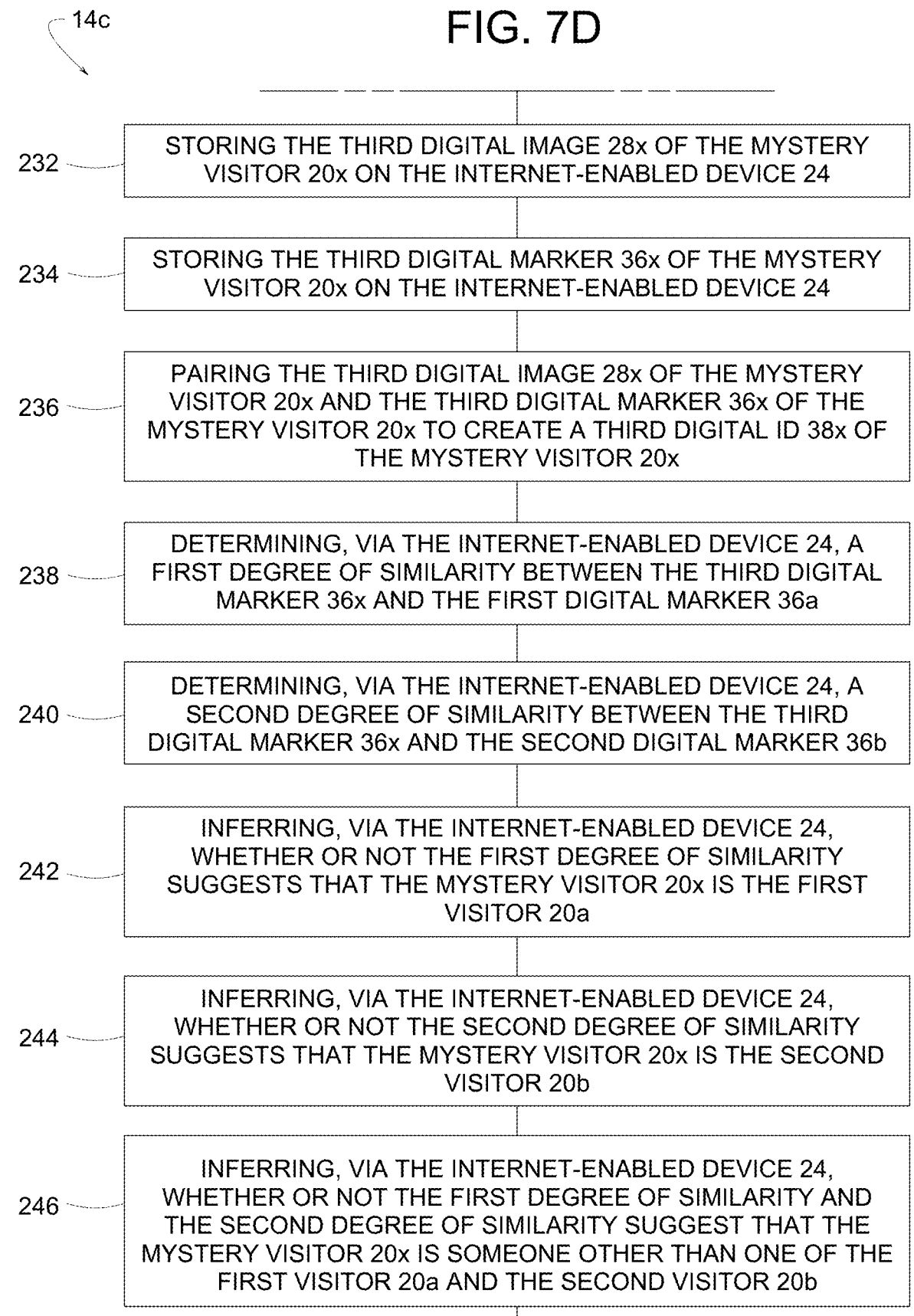
FIG. 7D is a flow diagram continuing from the bottom of FIG. 7C and illustrating various steps of the security camera method.

In FIG. 7D, block 232 represents storing the third digital image 28*x* of the mystery visitor 20*x* on the internet-enabled device 24. Block 234 represents storing the third digital marker 36*x* of the mystery visitor 20*x* on the internet-enabled device 24. Block 236 represents pairing the third digital image 28*x* of the mystery visitor 20*x* and the third digital marker 36*x* of the mystery visitor 20*x* to create a third two-part digital ID 38*x* of the mystery visitor 20*x*. Block 238 represents determining, via the internet-enabled device 24, a first degree of similarity between the third digital marker 36*x* and the first digital marker 36*a*. Block 240 represents determining, via the internet-enabled device 24, a second degree of similarity between the third digital marker 36*x* and the second digital marker 36*b*. Block 242 represents inferring, via the internet-enabled device 24, whether or not the first degree of similarity suggests that the mystery visitor 20*x* is the first visitor 20*a*. The closer the digital markers 36*a* and 36*x* match, the greater the likelihood that the digital markers 36*a* and 36*x* represent the same person, e.g., the mystery visitor 20*x* is probably Tyler. Block 244 represents inferring, via the internet-enabled device 24, whether or not the second degree of similarity suggests that the mystery visitor 20*x* is the second visitor 20*b*. The closer the digital markers 36*b* and 36*x* match, the greater the likelihood that the digital markers 36*b* and 36*x* represent the same person, e.g., the mystery visitor 36*x* is probably Ashia.

Block 246 represents inferring, via the internet-enabled device 24, whether or not the first degree of similarity and the second degree of similarity suggest that the mystery visitor 20*x* is someone other than one of the first visitor 20*a* and the second visitor 20*b*. The greater the disparity between the digital marker 36*x* and the digital markers 36*a* and 36*b*, the greater the likelihood that the digital marker 36*x* represents someone other than visitors 20*a* or 20*b*, e.g., probably someone other than Tyler or Ashia.

In FIG. 7E, block 248 represents adding the third two-part digital ID 38x to the first two-part digital ID 38a when the internet-enabled device 24 infers that the first degree of similarity suggests that the mystery visitor 20x is the first visitor 20a. The term, "adding" in this context simply means increasing or supplementing the collected information or knowledge about the first visitor 20a.

Block 250 represents adding the third two-part digital ID 38x to the second two-part digital ID 38b when the internet-enabled device 24 infers that the second degree of similarity suggests that the mystery visitor 20x is the second visitor 20b. The term, "adding" in this context simply means increasing or supplementing the collected information or knowledge about the second visitor 20b.

Block 252 represents providing the resident 16, via the internet-enabled device 24, an alert 84 indicating that the mystery visitor 20x is the first visitor 20a when the internet-enabled device 24 infers that the first degree of similarity suggests that the mystery visitor 20x is the first visitor 20a, wherein the alert 84 indicates at least one of the first label 76a' and the first security rating 78a'.

Block 254 represents providing the resident 16, via the internet-enabled device 24, a notification 86 indicating that the mystery visitor 20x is the second visitor 20b when the internet-enabled device 24 infers that the second degree of similarity suggests that the mystery visitor 20x is the second visitor 20b, wherein the notification 86 indicates at least one of the second label 76b' and the second security rating 78b'.

Block 256 represents providing the resident 16, via the internet-enabled device 24, a new notification 88 indicating that the mystery visitor 20x is someone other than one of the first visitor 20a and the second visitor 20b when the first degree of similarity and the second degree of similarity suggest that the mystery visitor 20x is someone other than one of the first visitor 20a and the second visitor 20b.

In FIG. 7F, block 258 represents offering the resident 16, via the internet-enabled device 24, at least one of the following three options:
 a) a third labeling option 76x to assign a third label 76x' to the mystery visitor 20x;
 b) a third rating option 78x to assign a third security rating 78x' to the mystery visitor 20x, wherein the third security rating 78x' indicates how well the resident 16 trusts the mystery visitor 20x; and
 c) a third sharing option 80x that indicates whether or not the internet-enabled device 24 is to share the third two-part digital ID 38x of the mystery visitor 20x with the community member 48.

Block 260 represents excluding the true MAC address from the mystery probe request 30x, thereby preserving some privacy of the mystery visitor 20x. Although the true MAC address might be excluded, an alias MAC address or randomized MAC address might be included, transmitted and sniffed.

Block 262 represents distinguishing, via at least one of the internet-enabled device 24 and the packet scanner 26, the first probe request 30a among the multiplicity of probe requests 30 based at least partially on a transmission signal strength between the internet-enabled device 24 and the first mobile wireless system 10a and/or 10b.

In FIG. 7G, block 264 represents distinguishing, via at least one of the internet-enabled device 24 and the packet scanner 26, the first probe request 30a among the multiplicity of probe requests 30 based at least partially on how often each of the multiplicity of probe requests 30 are detected by the packet scanner 26 prior to the first instance of time.

Block 266 represents transmitting a plurality of IP packets in a handshake 25 between the mystery mobile wireless system 10a and/or 10b and a less restricted Wi-Fi network. In some examples, the term "less restricted Wi-Fi network" simply means that the less restricted Wi-Fi network is easier to access than a secure or more restricted one, such as a secure network requiring a password.

Block 268 represents acquiring, via the internet-enabled device 24, a true MAC address of the mystery mobile wireless system 10a and/or 10b upon transmitting the plurality of IP packets in a handshake 25 between the mystery mobile wireless system 10a and/or 10b and the less restricted Wi-Fi network.

FIGS. 8-12 show some examples in which the packet scanner 26 is more closely associated with the security camera 22 than with the internet-enabled device 24. In other words, in some examples, the packet scanner 26 is physically closer to the security camera 22 than to the internet-enabled device 24. This can help focus the packet scanner's signal reception toward the mobile wireless device 10 that is closest to the security camera 22, thus making the security camera system 12 less reliant on having to filter out irrelevant probe requests. It can also provide more compact, versatile or marketable product offerings.

In the example shown in FIGS. 8 and 9, the security camera 22 and the packet scanner 26 are both contained within a common housing 90. This can provide a neater, more compact design.

In some examples, an electromagnetic shield 92 covers at least some of the packet scanner 26. This helps focus the packet scanner 26 toward a selected portion 18a (FIG. 11) of the area 18, thereby blocking irrelevant signals from other more remote devices. In some examples, the electromagnetic shield 92 is a coating on the housing 90. In some examples, the housing 90 itself is made of a known electromagnet shielding material such as plastic injection moldable polymers with fillers such as, metallic particles, graphene, carbon fibers, etc. The term, "selected portion" simply means a subset of the area 18. In some examples, the selected portion 18a might be at the front door or on the front porch.

Figure 10:
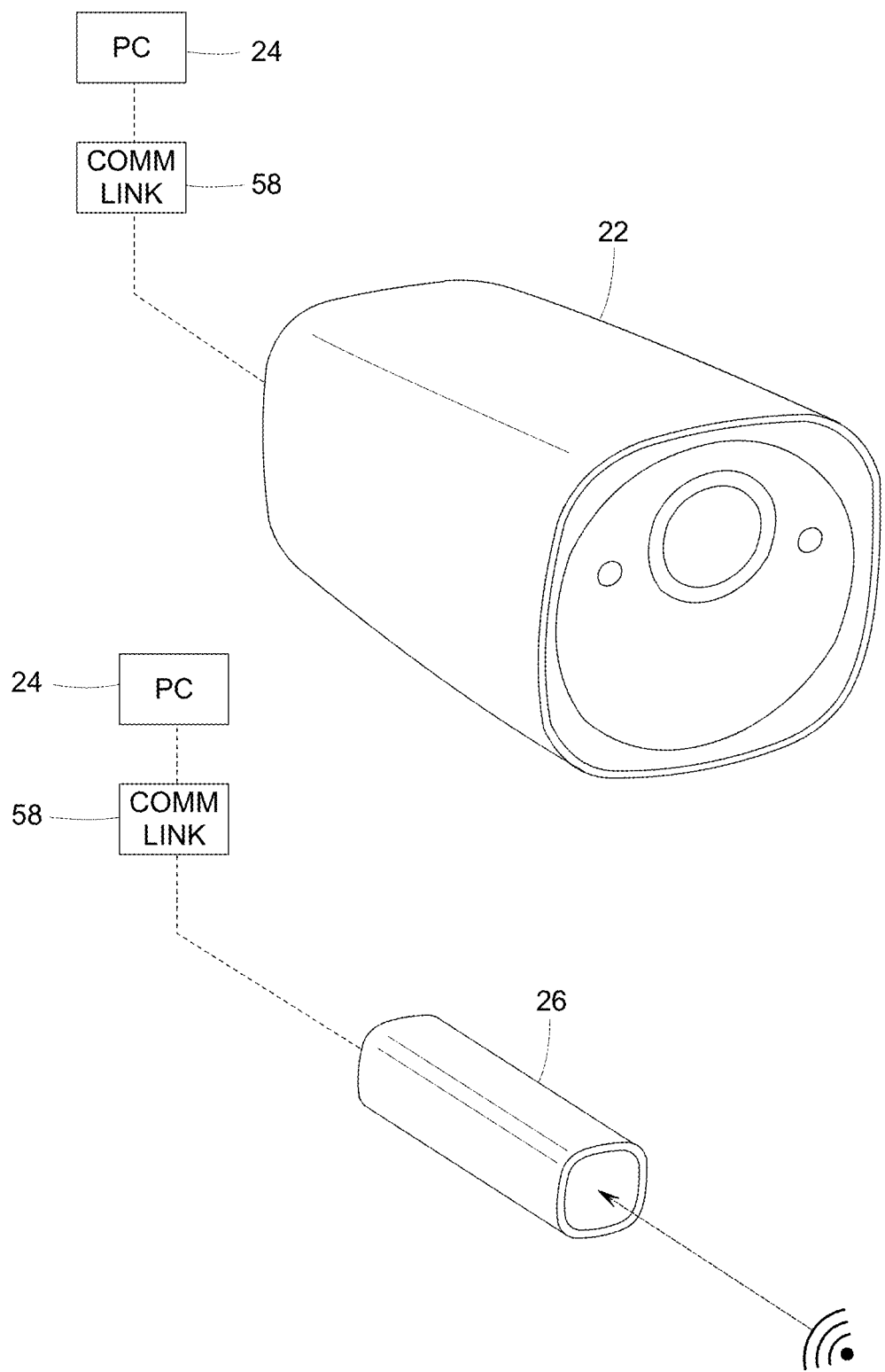
FIG. 10 is a perspective view of an example security camera and example packet scanner that could be used in the example security camera systems and methods disclosed herein.

In the example shown in FIG. 10, the security camera 22 and the packet scanner 26 are spaced apart from each other, and both are spaced apart from the internet-enabled device 24. This allows the security camera 22 and the packet scanner 26 to be sold separately. It also provides the resident 16 with more mounting options, as shown in FIGS. 11 and 12.

Figure 11:
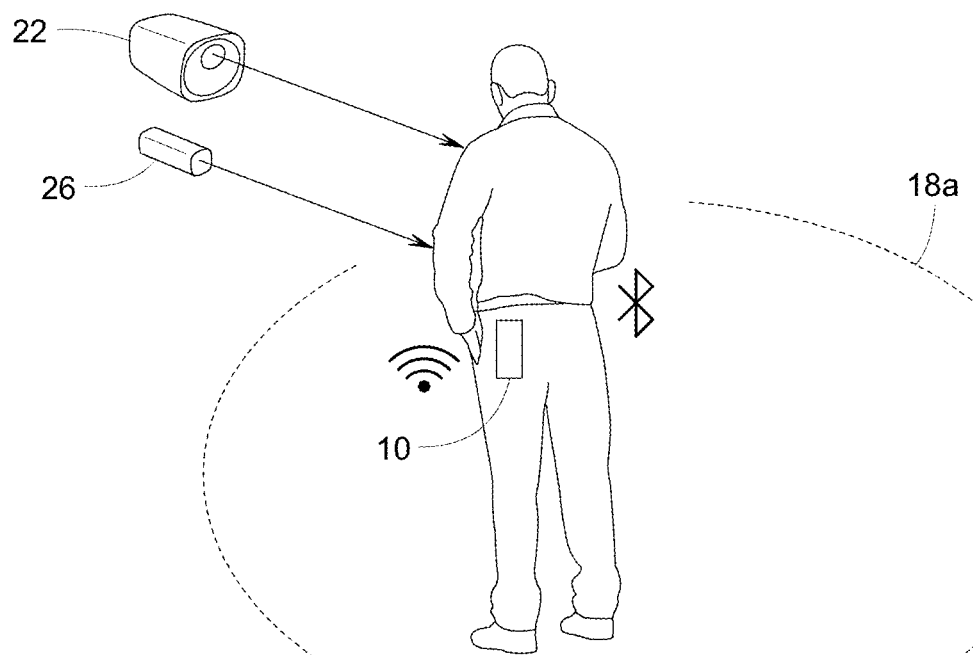
FIG. 11 is a perspective view showing an example installation configuration of the security camera and packet scanner shown in FIG. 10.
Figure 12:
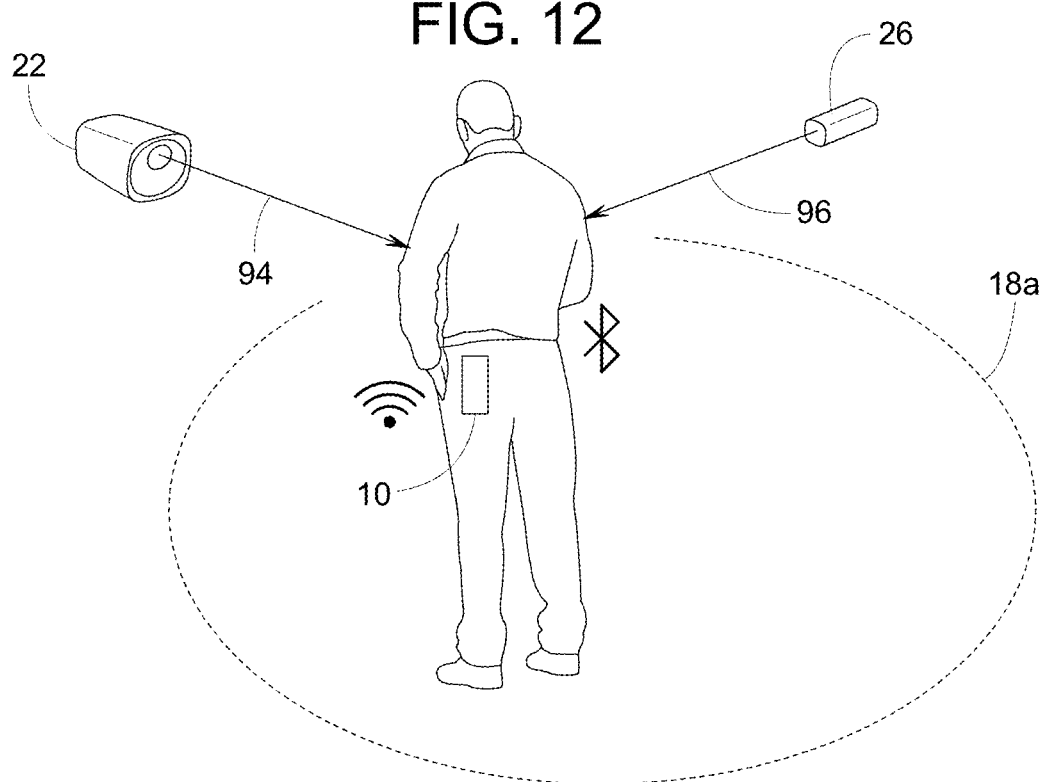
FIG. 12 is a perspective view showing another example installation configuration of the security camera and packet scanner shown in FIG. 10.

FIG. 11 shows a mounting option in which both the security camera 22 and the packet scanner 26 are aimed in substantially the same direction (i.e., less than five degrees of parallel to each other) toward the selected portion 18a of the area 18. FIG. 12 shows an alternate mounting option in which the security camera 22 and the packet scanner 26 are pointed in different directions. In FIG. 12, the security camera 22 is aimed in a first direction 94, while the packet scanner 26 is aimed in a second direction 96, yet both are pointed toward the selected portion 18a of the area 18. In some examples, the second direction 96 deviates from the first direction 94 by at least five degrees.

In some examples, the communication link 58 connects the security camera 22 and/or the packet scanner 26 in signal communication with the internet-enabled device 24. As mentioned earlier, some examples of the communication link 58 include a hardwired connection, a wireless connection, Ethernet, PoE (Power over Ethernet), wireless Ethernet bridge, various combinations thereof, etc.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The invention claimed is:

1. A security camera method for monitoring an area associated with a resident and being accessible by a visitor with a mobile wireless device that has a MAC address; the security camera method involving the use of a security camera in the area, an internet-enabled device, and a packet scanner for receiving a plurality of probe requests including a first probe request from the first mobile wireless system and a second probe request from the second mobile wireless system; the security camera method comprising:
   monitoring the area with the security camera;
   monitoring the area with the packet scanner;
   detecting, via the security camera, the visitor being in the area at a first instance of time, thereby defining a first event;
   capturing, via the security camera, a first digital image of the visitor in the area at the first instance of time;
   detecting, via the packet scanner, the first probe request transmitted from the mobile wireless system of the visitor proximate the first instance of time;
   transmitting, via the packet scanner, the MAC address from the mobile wireless device of the visitor to the internet-enabled device proximate the first instance of time;
   storing the first digital image of the visitor on the internet-enabled device;
   storing the MAC address of the mobile wireless device of the visitor on the internet-enabled device;
   pairing the first digital image and the MAC address to create a two-part digital ID of the visitor;
   offering the resident, via the internet-enabled device, a labeling option to assign a label to the two-part digital ID of the visitor;
   assigning a label to the two-part digital ID of the visitor via the resident interacting with the internet-enabled device;
   detecting, via the security camera, the visitor being in the area at a second instance of time, thereby defining a second event;
   capturing, via the security camera, a second digital image of the visitor in the area at the second instance of time;
   detecting, via the packet scanner, the second probe request transmitted from the mobile wireless system of the visitor proximate the second instance of time;
   transmitting, via the packet scanner, the MAC address from the mobile wireless device of the visitor to the internet-enabled device proximate the second instance of time; and
   providing a notice to the resident, via the internet-enabled device, that the second event is associated with the label of the two-part digital ID based at least partially on the MAC address transmitted from the mobile wireless device of the visitor to the internet-enabled device proximate the second instance of time.

2. The security camera method of claim 1, wherein the MAC address is a true MAC address of the mobile wireless device.

3. The security camera method of claim 1, wherein the MAC address is an alias MAC address stored on the mobile wireless device.

4. The security camera method of claim 1, wherein the mobile wireless device is Wi-Fi enabled.

5. The security camera method of claim 1, wherein the mobile wireless device is Bluetooth enabled.

6. The security camera method of claim 1, wherein the first probe request is one among a multiplicity of probe requests that happen proximate the first instance of time, and the security camera method further comprising:
   distinguishing, via at least one of the packet scanner and the internet-enabled device, the first probe request among the multiplicity of probe requests based at least partially on a transmission signal strength between the packet scanner and the first mobile wireless device.

7. The security camera method of claim 1, wherein the first probe request is one among a multiplicity of probe requests that happen proximate the first instance of time, and the security camera method further comprising:
   distinguishing, via at least one of the packet scanner and the internet-enabled device, the first probe request among the multiplicity of probe requests based at least partially on how often each of the multiplicity of probe requests are detected by the packet scanner prior to the first instance of time.

8. A security camera method for monitoring an area associated with a resident and being accessible by a plurality of visitors including a first visitor with a first mobile wireless system, a second visitor with a second mobile wireless system, and a mystery visitor with a mystery mobile wireless system that has a true MAC address; the security camera method involving the use of a security camera in the first area, an internet-enabled device, and a packet scanner for receiving a plurality of probe requests including a first probe request from the first mobile wireless system, a second probe request from the second mobile wireless system, and a mystery probe request from the mystery mobile wireless system; the security camera method providing potential value to a community member, wherein the community member is another resident of another area, the security camera method comprising:
   monitoring the area with the security camera;
   monitoring the area with the packet scanner;
   detecting, via the security camera, the first visitor being in the area at a first instance of time;
   capturing, via the security camera, a first digital image of the first visitor in the area at the first instance of time;
   detecting, via the packet scanner, the first probe request transmitted from the first mobile wireless system of the first visitor, wherein the first probe request is one among a multiplicity of probe requests that happen proximate the first instance of time, the first probe request includes a first plurality of data having a first content in a first arrangement that provides a first digital marker of the first visitor;
   distinguishing, via at least one of the internet-enabled device and the packet scanner, the first probe request from among the multiplicity of probe requests based at least partially on one of the following:
   a) a transmission signal strength between the packet scanner and the first mobile wireless system, and
   b) how often each of the multiplicity of probe requests are detected by the packet scanner prior to the first instance of time;
   storing the first digital image of the first visitor on at least one of the security camera and the internet-enabled device;

storing the first digital marker of the first visitor on at least one of the security camera and the internet-enabled device;
pairing the first digital image of the first visitor and the first digital marker of the first visitor to create a first two-part digital ID of the first visitor;
detecting, via the security camera, the second visitor being in the area at a second instance of time;
capturing, via the security camera, a second digital image of the second visitor in the area at the second instance of time;
detecting, via the packet scanner, the second probe request transmitted from the second mobile wireless system of the second visitor, wherein the second probe request happens proximate the second instance of time, and the second probe request includes a second plurality of data having a second content in a second arrangement that provides a second digital marker of the second visitor;
storing the second digital image of the second visitor on at least one of the security camera and the internet-enabled device;
storing the second digital marker of the second visitor on the internet-enabled device;
pairing the second digital image of the second visitor and the second digital marker of the second visitor to create a second two-part digital ID of the second visitor;
detecting, via the security camera, the mystery visitor being in the area at a third instance of time;
capturing, via the security camera, a third digital image of the mystery visitor in the area at the third instance of time;
detecting, via the packet scanner, the mystery probe request transmitted from the mystery mobile wireless system of the mystery visitor, wherein the mystery probe excludes the true MAC address of the mystery mobile wireless system, thereby preserving some privacy of the mystery visitor; the mystery probe request happens proximate the third instance of time, and the mystery probe request includes a third plurality of data having a third content in a third arrangement that provides a third digital marker of the mystery visitor;
storing the third digital image of the mystery visitor on at least one of the security camera and the internet-enabled device;
storing the third digital marker of the mystery visitor on the internet-enabled device;
pairing the third digital image of the mystery visitor and the third digital marker of the mystery visitor to create a third two-part digital ID of the mystery visitor;
determining, via the internet-enable device, a first degree of similarity between the third digital marker and the first digital marker; and
inferring, via the internet-enable device, whether or not the first degree of similarity suggests that the mystery visitor is the first visitor.

9. The security camera method of claim 8, further comprising offering the resident, via the internet-enable device, at least one of the following three options:
a) a first labeling option to assign a first label to the first visitor;
b) a first rating option to assign a first security rating to the first visitor, wherein the first security rating indicates how well the resident trusts the first visitor; and
c) a first sharing option that indicates whether or not the internet-enabled device is to share the first two-part digital ID of the first visitor with the community member.

10. The security camera method of claim 9, further comprising:
adding the third two-part digital ID to the first two-part digital ID when the internet-enable device infers that the first degree of similarity suggests that the mystery visitor is the first visitor; and
providing the resident, via the internet-enabled device, an alert indicating that the mystery visitor is the first visitor when the internet-enable device infers that the first degree of similarity suggests that the mystery visitor is the first visitor, wherein the alert indicates at least one of the first label and the first security rating applies to the mystery visitor.

11. The security camera method of claim 8, wherein the mystery probe request includes at least one of an alias MAC address and a randomized MAC address instead of the true MAC address.

12. A security camera method for monitoring an area associated with a resident and being accessible by a plurality of visitors including a first visitor with a first mobile wireless system, a second visitor with a second mobile wireless system, and a mystery visitor with a mystery mobile wireless system; the security camera method involving the use of a security camera in the area, an internet-enabled device, and a packet scanner for receiving a plurality of probe requests including a first probe request from the first mobile wireless system, a second probe request from the second mobile wireless system, and a mystery probe request from the mystery mobile wireless system; the security camera method providing potential value to a community member, wherein the community member is another resident of another area, the security camera method comprising:
monitoring the area with the security camera;
monitoring the area with the packet scanner;
detecting, via the security camera, the first visitor being in the area at a first instance of time;
capturing, via the security camera, a first digital image of the first visitor in the area at the first instance of time;
detecting, via the packet scanner, the first probe request transmitted from the first mobile wireless system of the first visitor, wherein the first probe request happens proximate the first instance of time, and the first probe request includes a first plurality of data having a first content in a first arrangement that provides a first digital marker of the first visitor;
storing the first digital image of the first visitor on the internet-enabled device;
storing the first digital marker of the first visitor on the internet-enabled device;
pairing the first digital image of the first visitor and the first digital marker of the first visitor to create a first two-part digital ID of the first visitor;
offering the resident, via the internet-enabled device, at least one of the following three options:
d) a first labeling option to assign a first label to the first visitor;
e) a first rating option to assign a first security rating to the first visitor, wherein the first security rating indicates how well the resident trusts the first visitor; and
f) a first sharing option that indicates whether or not the internet-enabled device is to share the first two-part digital ID of the first visitor with the community member;
detecting, via the security camera, the second visitor being in the area at a second instance of time;

capturing, via the security camera, a second digital image of the second visitor in the area at the second instance of time;

detecting, via the packet scanner, the second probe request transmitted from the second mobile wireless system of the second visitor, wherein the second probe request happens proximate the second instance of time, and the second probe request includes a second plurality of data having a second content in a second arrangement that provides a second digital marker of the second visitor;

storing the second digital image of the second visitor on the internet-enabled device;

storing the second digital marker of the second visitor on the internet-enabled device;

pairing the second digital image of the second visitor and the second digital marker of the second visitor to create a second two-part digital ID of the second visitor;

offering the resident, via the internet-enabled device, at least one of the following three options:

a) a second labeling option to assign a second label to the second visitor;

b) a second rating option to assign a second security rating to the second visitor, wherein the second security rating indicates how well the resident trusts the second visitor; and c) a second sharing option that indicates whether or not the internet-enabled device is to share the second two-part digital ID of the second visitor with the community member;

detecting, via the security camera, the mystery visitor being in the area at a third instance of time;

capturing, via the security camera, a third digital image of the mystery visitor in the area at the third instance of time;

detecting, via the packet scanner, the mystery probe request transmitted from the mystery mobile wireless system of the mystery visitor, wherein the mystery probe request happens proximate the third instance of time, and the mystery probe request includes a third plurality of data having a third content in a third arrangement that provides a third digital marker of the mystery visitor;

storing the third digital image of the mystery visitor on the internet-enabled device;

storing the third digital marker of the mystery visitor on the internet-enabled device;

pairing the third digital image of the mystery visitor and the third digital marker of the mystery visitor to create a third two-part digital ID of the mystery visitor;

determining, via the internet-enabled device, a first degree of similarity between the third digital marker and the first digital marker;

determining, via the internet-enabled device, a second degree of similarity between the third digital marker and the second digital marker;

inferring, via the internet-enabled device, whether or not the first degree of similarity suggests that the mystery visitor is the first visitor;

inferring, via the internet-enabled device, whether or not the second degree of similarity suggests that the mystery visitor is the second visitor;

inferring, via the internet-enabled device, whether or not the first degree of similarity and the second degree of similarity suggest that the mystery visitor is someone other than one of the first visitor and the second visitor;

adding the third two-part digital ID to the first two-part digital ID when the internet-enabled device infers that the first degree of similarity suggests that the mystery visitor is the first visitor;

adding the third two-part digital ID to the second two-part digital ID when the internet-enabled device infers that the second degree of similarity suggests that the mystery visitor is the second visitor;

providing the resident, via the internet-enabled device, an alert 4 indicating that the mystery visitor is the first visitor when the internet-enabled device infers that the first degree of similarity suggests that the mystery visitor is the first visitor, wherein the alert 4 indicates at least one of the first label and the first security rating;

providing the resident, via the internet-enabled device, a notification indicating that the mystery visitor is the second visitor when the internet-enabled device infers that the second degree of similarity suggests that the mystery visitor is the second visitor, wherein the notification indicates at least one of the second label and the second security rating;

providing the resident, via the internet-enabled device, a new notification indicating that the mystery visitor is someone other than one of the first visitor and the second visitor when the first degree of similarity and the second degree of similarity suggest that the mystery visitor is someone other than one of the first visitor and the second visitor; and offering the resident, via the internet-enabled device, at least one of the following three options:

a) a third labeling option to assign a third label to the mystery visitor;

b) a third rating option to assign a third security rating to the mystery visitor, wherein the third security rating indicates how well the resident trusts the mystery visitor; and c) a third sharing option that indicates whether or not the internet-enabled device is to share the third two-part digital ID of the mystery visitor with the community member.

13. The security camera method of claim 12, wherein the mystery mobile wireless system includes a true MAC address, and the security camera method further comprising excluding the true MAC address from the mystery probe request, thereby preserving some privacy of the mystery visitor.

14. The security camera method of claim 12, wherein at least one of the first mobile wireless system, the second mobile wireless system and the mystery mobile wireless system is Wi-Fi enabled.

15. The security camera method of claim 12, wherein at least one of the first mobile wireless system, the second mobile wireless system and the mystery mobile wireless system is Bluetooth enabled.

16. The security camera method of claim 12, wherein at least one of the first mobile wireless system, the second mobile wireless system and the mystery mobile wireless system comprises a plurality of mobile wireless devices.

17. The security camera method of claim 12, wherein at least one of the first plurality of data, the second plurality of data, and the mystery plurality of data includes a first portion of data transmitted by Wi-Fi and a second portion of data transmitted by Bluetooth.

18. The security camera method of claim 12, wherein at least one of the first plurality of data, the second plurality of data, and the mystery plurality of data was transmitted in a plurality of IP packets.

19. The security camera method of claim 12, wherein determining the first degree of similarity involves comparing a first order in which the first plurality of data is arranged in the first probe request to a second order in which the third plurality of data is arranged in the mystery probe request.

20. The security camera method of claim 12, wherein determining the first degree of similarity involves comparing the first content of the first probe request to the third content of the mystery probe request.

21. The security camera method of claim 12, wherein adding the third two-part digital ID to the first two-part digital ID results in the first two-part digital ID growing to comprise a plurality digital markers, wherein the plurality of digital markers includes the first digital marker and the third digital marker.

22. The security camera method of claim 12, wherein the first probe request is one among a multiplicity of probe requests that happen proximate the first instance of time, and the security camera method further comprising:
   distinguishing, via at least one of the internet-enabled device and the packet scanner, the first probe request among the multiplicity of probe requests based at least partially on a transmission signal strength between the internet-enabled device and the first mobile wireless system.

23. The security camera method of claim 12, wherein the first probe request is one among a multiplicity of probe requests that happen proximate the first instance of time, and the security camera method further comprising:
   distinguishing, via at least one of the internet-enabled device and the packet scanner, the first probe request among the multiplicity of probe requests based at least partially on how often each of the multiplicity of probe requests are detected by the packet scanner prior to the first instance of time.

24. The security camera method of claim 12, wherein the internet-enabled device includes a more restricted Wi-Fi network and a less restricted Wi-Fi network, wherein the more restricted Wi-Fi network provides the resident with secure Internet communication, and the less restricted Wi-Fi network provides the plurality of visitors with less restricted Internet communication; and the security camera method further comprising:
   transmitting a plurality of IP packets in a handshake between the mystery mobile wireless system and the less restricted Wi-Fi network; and
   acquiring, via the internet-enabled device, a true MAC address of the mystery mobile wireless system upon transmitting the plurality of IP packets in the handshake between the mystery mobile wireless system and the less restricted Wi-Fi network.

25. A security camera method for monitoring an area associated with a resident and being accessible by a plurality of visitors including a first visitor with a first mobile wireless system, a second visitor with a second mobile wireless system, and a mystery visitor with a mystery mobile wireless system; the security camera method involving the use of a security camera in the area, an internet-enabled device, and a packet scanner for receiving a plurality of probe requests including a first probe request from the first mobile wireless system, a second probe request from the second mobile wireless system, and a mystery probe request from the mystery mobile wireless system; the security camera method providing potential value to a community member, wherein the community member is another resident of another area, the security camera method comprising:
   monitoring the area with the security camera;
   monitoring the area with the packet scanner;
   detecting, via the security camera, the first visitor being in the area at a first instance of time;
   capturing, via the security camera, a first digital image of the first visitor in the area at the first instance of time;
   detecting, via the packet scanner, the first probe request transmitted from the first mobile wireless system of the first visitor, wherein the first probe request happens proximate the first instance of time, and the first probe request includes a first plurality of data having a first content in a first arrangement that provides a first digital marker of the first visitor;
   storing the first digital image of the first visitor on the internet-enabled device;
   storing the first digital marker of the first visitor on the internet-enabled device;
   pairing the first digital image of the first visitor and the first digital marker of the first visitor to create a first two-part digital ID of the first visitor;
   offering the resident, via the computer system, a first labeling option to assign a first label to the first visitor;
   offering the resident, via the internet-enabled device, a first rating option to assign a first security rating to the first visitor, wherein the first security rating indicates how well the resident trusts the first visitor;
   offering the resident, via the internet-enabled device, a first sharing option that indicates whether or not the internet-enabled device is to share the first two-part digital ID of the first visitor with the community member;
   detecting, via the security camera, the second visitor being in the area at a second instance of time;
   capturing, via the security camera, a second digital image of the second visitor in the area at the second instance of time;
   detecting, via the packet scanner, the second probe request transmitted from the second mobile wireless system of the second visitor, wherein the second probe request happens proximate the second instance of time, and the second probe request includes a second plurality of data having a second content in a second arrangement that provides a second digital marker of the second visitor;
   storing the second digital image of the second visitor on the internet-enabled device;
   storing the second digital marker of the second visitor on the internet-enabled device;
   pairing the second digital image of the second visitor and the second digital marker of the second visitor to create a second two-part digital ID of the second visitor;
   offering the resident, via the internet-enabled device, a second labeling option to assign a second label to the second visitor;
   offering the resident, via the internet-enabled device, a second rating option to assign a second security rating to the second visitor, wherein the first security rating indicates how well the resident trusts the second visitor;
   offering the resident, via the internet-enabled device, a second sharing option that indicates whether or not the internet-enabled device is to share the second two-part digital ID of the second visitor with the community member;
   detecting, via the security camera, the mystery visitor being in the area at a third instance of time;
   capturing, via the security camera, a third digital image of the mystery visitor in the area at the third instance of time;

detecting, via the packet scanner, the mystery probe request transmitted from the mystery mobile wireless system of the mystery visitor, wherein the mystery probe request happens proximate the third instance of time, and the mystery probe request includes a third plurality of data having a third content in a third arrangement that provides a third digital marker of the mystery visitor;

storing the third digital image of the mystery visitor on the internet-enabled device;

storing the third digital marker of the mystery visitor on the internet-enabled device;

pairing the third digital image of the mystery visitor and the third digital marker of the mystery visitor to create a third two-part digital ID of the mystery visitor;

determining, via the internet-enabled device, a first degree of similarity between the third digital marker and the first digital marker;

determining, via the internet-enabled device, a second degree of similarity between the third digital marker and the second digital marker;

inferring, via the internet-enabled device, whether or not the first degree of similarity suggests that the mystery visitor is the first visitor;

inferring, via the internet-enabled device, whether or not the second degree of similarity suggests that the mystery visitor is the second visitor;

inferring, via the internet-enabled device, whether or not the first degree of similarity and the second degree of similarity suggest that the mystery visitor is someone other than one of the first visitor and the second visitor;

adding the third two-part digital ID to the first two-part digital ID when the internet-enabled device infers that the first degree of similarity suggests that the mystery visitor is the first visitor;

adding the third two-part digital ID to the second two-part digital ID when the internet-enabled device infers that the second degree of similarity suggests that the mystery visitor is the second visitor;

providing the resident, via the internet-enabled device, an alert indicating that the mystery visitor is the first visitor when the internet-enabled device infers that the first degree of similarity suggests that the mystery visitor is the first visitor, wherein the alert indicates at least one of the first label and the first security rating;

providing the resident, via the internet-enabled device, a notification indicating that the mystery visitor is the second visitor when the c internet-enabled device infers that the second degree of similarity suggests that the mystery visitor is the second visitor, wherein the notification indicates at least one of the second label and the second security rating;

providing the resident, via the internet-enabled device, a new notification indicating that the mystery visitor is someone other than one of the first visitor and the second visitor when the first degree of similarity and the second degree of similarity suggest that the mystery visitor is someone other than one of the first visitor and the second visitor;

offering the resident, via the internet-enabled device, a third labeling option to assign a third label to the mystery visitor if the first degree of similarity and the second degree of similarity suggest that the mystery visitor is someone other than one of the first visitor and the second visitor;

offering the resident, via the internet-enabled device, a third rating option to assign a third security rating to the mystery visitor if the first degree of similarity and the second degree of similarity suggest that the mystery visitor is someone other than one of the first visitor and the second visitor, wherein the third security rating indicates how well the resident trusts the mystery visitor; and offering the resident, via the internet-enabled device, a third sharing option that indicates whether or not the internet-enabled device is to share the third two-part digital ID with the community member.

\* \* \* \* \*